(12) United States Patent
Tan et al.

(10) Patent No.: US 10,397,138 B2
(45) Date of Patent: *Aug. 27, 2019

(54) METHOD FOR PROCESSING INFORMATION, FORWARDING PLANE DEVICE AND CONTROL PLANE DEVICE

(71) Applicant: Huawei Technologies Co., Ltd., Shenzhen (CN)

(72) Inventors: Shiyong Tan, Beijing (CN); Hui Ni, Beijing (CN); Hui Cai, Shenzhen (CN); Weihua Hu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/680,007

(22) Filed: Aug. 17, 2017

(65) Prior Publication Data

US 2017/0346764 A1 Nov. 30, 2017

Related U.S. Application Data

(63) Continuation of application No. 14/581,240, filed on Dec. 23, 2014, now Pat. No. 9,769,089, which is a
(Continued)

(51) Int. Cl.
*H04W 76/12* (2018.01)
*H04W 88/16* (2009.01)
(Continued)

(52) U.S. Cl.
CPC ............ *H04L 49/252* (2013.01); *H04L 12/14* (2013.01); *H04L 12/1407* (2013.01);
(Continued)

(58) Field of Classification Search
CPC ..... H04L 12/56; H04L 12/5689; H04L 45/00; H04L 45/302; H04L 45/38; H04L 45/40;
(Continued)

(56) References Cited

U.S. PATENT DOCUMENTS 7,324,529 B2 * 1/2008 Lucidarme ............ H04L 47/724
370/401
7,620,389 B2 11/2009 Kallio et al.
(Continued)

FOREIGN PATENT DOCUMENTS

CN 101730007 A 6/2010
CN 101946459 A 1/2011
(Continued)

OTHER PUBLICATIONS

Sama et al., Enabling network programmability in LTE/EPC architecture using OpenFlow, May 16, 2014, IEEE, 2014 12th International Symposium on Modeling and Optimization in Mobile, Ad Hoc, and Wireless Networks (WiOpt) (Year: 2014).*
(Continued)

*Primary Examiner* — Eric Nowlin
(74) *Attorney, Agent, or Firm* — Slater Matsil, LLP

(57) ABSTRACT

Embodiments of the present invention provide a method for processing information, a forwarding plane device and a control plane device. The method includes: receiving a data packet, and extracting the data packet's characteristic information; searching for context information corresponding to the data packet's characteristic information; buffering or discarding the data packet if the context information is not found; and sending an event reporting message to a gateway control plane device, wherein the event reporting message carries the data packet's characteristic information, so that the gateway control plane device acquires the context information corresponding to the data packet's characteristic information. forwarding of the data packet to the greatest extent.

21 Claims, 16 Drawing Sheets

Related U.S. Application Data continuation of application No. PCT/CN2012/077893, filed on Jun. 29, 2012.

(51) Int. Cl.
  *H04L 12/741* (2013.01)
  *H04L 12/947* (2013.01)
  *H04L 12/14* (2006.01)
  *H04M 15/00* (2006.01)
  *H04W 4/24* (2018.01)

(52) U.S. Cl.
  CPC ............ *H04L 45/74* (2013.01); *H04M 15/64* (2013.01); *H04M 15/65* (2013.01); *H04M 15/66* (2013.01); *H04W 4/24* (2013.01); *H04W 76/12* (2018.02); *H04W 88/16* (2013.01)

(58) Field of Classification Search
  CPC ....... H04L 45/42; H04L 45/74; H04L 45/745; H04L 47/10; H04L 47/2441; H04L 47/2483; H04L 49/10; H04L 49/25; H04L 49/251; H04L 49/252; H04L 49/257; H04L 49/351; H04L 49/90; H04L 67/327; H04L 69/22; H04L 2012/5681; H04W 40/02; H04W 76/022; H04W 88/16
  See application file for complete search history.

(56) References Cited

U.S. PATENT DOCUMENTS

| | | | |
|---|---|---|---|
| 8,929,335 B2 | 1/2015 | Wang et al. | |
| 9,258,182 B2 | 2/2016 | Zakrzewski | |
| 9,288,179 B2 | 3/2016 | Yin et al. | |
| 9,307,453 B2 | 4/2016 | Wu et al. | |
| 9,319,536 B2 | 4/2016 | Cai et al. | |
| 9,374,293 B2 | 6/2016 | Chai | |
| 9,380,618 B2 | 6/2016 | Peng | |
| 9,413,641 B2 | 8/2016 | Zakrzewski et al. | |
| 9,461,908 B2 | 10/2016 | Wang et al. | |
| 9,467,849 B2 | 10/2016 | Zhang et al. | |
| 9,491,732 B2 | 11/2016 | Wang et al. | |
| 9,894,695 B2 * | 2/2018 | Chen | H04W 76/12 |
| 2002/0122387 A1 | 9/2002 | Ni | |
| 2002/0161918 A1 | 10/2002 | Asano et al. | |
| 2003/0067929 A1 | 4/2003 | Matsuzawa | |
| 2003/0154193 A1 | 8/2003 | Rosenblum | |
| 2004/0246972 A1 | 12/2004 | Wang et al. | |
| 2005/0058161 A1 | 3/2005 | Sorokopud et al. | |
| 2006/0268819 A1 | 11/2006 | Chen et al. | |
| 2007/0091862 A1 | 4/2007 | Ioannidis | |
| 2009/0067628 A1 | 3/2009 | Pudney et al. | |
| 2010/0118885 A1 | 5/2010 | Congdon | |
| 2010/0124223 A1 | 5/2010 | Gibbs et al. | |
| 2010/0312846 A1 * | 12/2010 | Lu | H04W 68/00 709/206 |
| 2011/0019668 A1 | 1/2011 | Diab et al. | |
| 2012/0093086 A1 | 4/2012 | Yin et al. | |
| 2012/0147872 A1 | 6/2012 | Zisimopoulos et al. | |
| 2012/0213073 A1 * | 8/2012 | Ang | H04W 28/085 370/235 |
| 2012/0275430 A1 | 11/2012 | Wang et al. | |
| 2013/0148502 A1 | 6/2013 | Yang et al. | |
| 2013/0250749 A1 | 9/2013 | Morishige et al. | |
| 2013/0272131 A1 | 10/2013 | Takano et al. | |
| 2014/0029574 A1 | 1/2014 | Suzuki | |
| 2014/0071880 A1 | 3/2014 | Lehtovirta | |
| 2014/0098816 A1 | 4/2014 | Matthews et al. | |
| 2015/0103766 A1 | 4/2015 | Miklós et al. | |
| 2015/0109898 A1 | 4/2015 | Wang et al. | |
| 2015/0109901 A1 | 4/2015 | Tan et al. | |
| 2015/0111531 A1 | 4/2015 | Cai et al. | |
| 2015/0111532 A1 | 4/2015 | Cai et al. | |
| 2015/0146513 A1 | 5/2015 | Zakrzewski et al. | |
| 2015/0146517 A1 | 5/2015 | Zakrzewski | |
| 2015/0146519 A1 | 5/2015 | Zakrzewski | |
| 2015/0215978 A1 | 7/2015 | Casati et al. | |
| 2015/0359019 A1 | 12/2015 | Chen et al. | |
| 2016/0080483 A1 | 3/2016 | Li et al. | |
| 2016/0099868 A1 | 4/2016 | Tan et al. | |
| 2016/0105790 A1 | 4/2016 | Shu | |
| 2016/0127967 A1 | 5/2016 | Liu et al. | |
| 2016/0165508 A1 | 6/2016 | Jin | |
| 2016/0173378 A1 | 6/2016 | Ni | |
| 2016/0226765 A1 | 8/2016 | Wang | |
| 2016/0242225 A1 | 8/2016 | Wang et al. | |
| 2016/0285820 A1 | 9/2016 | Tan et al. | |
| 2016/0315864 A1 | 10/2016 | Tan et al. | |
| 2016/0316398 A1 | 10/2016 | Han et al. | |
| 2016/0330167 A1 | 11/2016 | Cai | |
| 2016/0337250 A1 | 11/2016 | Ni | |

FOREIGN PATENT DOCUMENTS

| | | | |
|---|---|---|---|
| CN | 101959162 | A | 1/2011 |
| CN | 101998442 | A | 3/2011 |
| CN | 102026143 | A | 4/2011 |
| CN | 102291800 | A | 12/2011 |
| JP | 2010063022 | A | 3/2010 |
| WO | 2010052988 | A1 | 5/2010 |
| WO | 2012086570 | A1 | 6/2012 |

OTHER PUBLICATIONS

Ksentini, On Using SDN in 5G: The Controller Placement Problem, Dec. 8, 2016, IEEE, 2016 IEEE Global Communications Conference (GLOBECOM) (Year: 2016).*

Nguyen et al., Signaling load analysis in openflow-enabled LTE/EPC architecture, Oct. 24, 2014, IEEE, 2014 International Conference on Information and Communication Technology Convergence (ICTC) (Year: 2014).*

3rd Generation Partnership Project; Technical Specification Group Services and System Aspects; General Packet Radio Service (GPRS); Service description; Stage 2 (Release 11), 3GPP TS 23.060 V11.2.0 (Jun. 2012), 335 pages.

3rd Generation Partnership Project; Technical Specification Group Services and System Aspects; General Packet Radio Service (GPRS) enhancements for Evolved Universal Terrestrial Radio Access Network (E-UTRAN) access (Release 11), 3GPP TS 23.401 V11.2.0 (Jun. 2012), 285 pages.

3rd Generation Partnership Project; Technical Specification Group Core Network and Terminals; Restoration procedures (Release 11), 3GPP TS 23.007 V11.2.0 (Jun. 2012), 63 pages.

3rd Generation Partnership Project;Technical Specification Group Core Network and Terminals; 3GPP Evolved Packet System (EPS); Evolved General Packet Radio Service (GPRS) Tunnelling Protocol for Control plane (GTPv2-C); Stage 3 (Release 11), 3GPP TS 29.274 V11.3.0 (Jun. 2012), 219 pages.

\* cited by examiner

METHOD FOR PROCESSING INFORMATION, FORWARDING PLANE DEVICE AND CONTROL PLANE DEVICE

CROSS-REFERENCE TO RELATED APPLICATIONS

This application is a continuation of U.S. patent application Ser. No. 14/581,240, filed on Dec. 23, 2014, which is a continuation of International Application No. PCT/CN2012/077893, filed on Jun. 29, 2012. All of the afore-mentioned patent applications are hereby incorporated by reference in their entireties.

TECHNICAL FIELD

Embodiments of the present invention relate to communications, and more particularly, to a method for processing information, a forwarding plane device and a control plane device.

BACKGROUND

Standardization of 3GPP (The 3rd Generation Partnership Project) develops a brand-new evolved network, and SAE (System Architecture Evolution) of the evolved network is as shown in FIG. 1. In an SAE architecture, after a UE (User Equipment) is accessed to an E-UTRAN (Evolved Universal Terrestrial Radio Access Network) through a wireless air interface, the UE is first attached to an MME (Mobility Management Entity). The MME acquires subscription data and authentication information of a user from an HSS (Home Subscriber Server), and initiates a process for authenticating the UE. After the MME completes the authentication process, the UE or the MME initiates a process for establishing a bearer for transmitting user data. In this process, the MME notifies an S-GW (Serving Gateway) of establishing the bearer for the user, which is used for transmitting user data from the E-UTRAN to a P-GW (Packet Data Network Gateway), and the notification message carries an address of the P-GW and address information of an E-UTRAN network element where the user is located. The P-GW forwards downlink data from an external PDN (Packet Data Network) to the UE through the bearer, and forwards uplink data from the UE to a corresponding PDN.

In order to be compatible with existing UTRAN (Universal Terrestrial Radio Access Network) and GERAN (Global System for Mobile communications/Enhanced Data rates for GSM Evolution Radio Access Network, GSM/EDGE radio access network), a UE may access an MME through a UTRAN or a GERAN, and an SGSN (Serving GPRS (General Packet Radio Service) Support Node), and may establish a GTP (GPRS Tunnel Protocol) tunnel connection with an S-GW through a UTRAN/GERAN and an SGSN. The S-GW converts a GTP tunnel into a corresponding bearer connected to a P-GW which is used for transmitting user data. The UTRAN may also directly establish a GTP tunnel connected to an S-GW. An MME becomes a network element for only processing control plane signaling, and an S-GW and a P-GW are primarily responsible for forwarding user plane data. An S-GW and a P-GW may be combined into a network element, which may be referred to as a unified gateway (UGW).

With development of mobile internet services, abundance of enterprise network services and fusion of mobile access networks with multiple technologies, a gateway device needs to gradually develop towards more fine service control and charging based on realization of a basic data forwarding function, thus supporting more abundant service implementation and control of an operator. Meanwhile, in an evolved network, a UGW still needs to reserve a great number of external signaling interfaces. These signaling interfaces include a GTP-C (GTP control plane) bearer interface between an MME and a gateway, a PCC (Policy and Charging Control) interface between a PCRF (Policy and Charging Rules Function) and a gateway, a charging interface between a charging system and a gateway, a legitimate listening interface between legitimate listening device and a gateway, a DHCP interface between a DHCP (Dynamic Host Configuration Protocol) server and a gateway, an interface between an AAA (Authentication, Authorization and Accounting) server and a gateway and the like.

In order to enable a gateway to be capable of processing a great amount of interface signaling, a large number of hardwares such as a general computing processor chip and the like are added on the basis of a dedicated hardware platform, which makes a hardware platform of a gateway device quite complex and cost too much, thus is unfavorable for spread and deployment of a mobile packet data network.

For solving the above-mentioned problem, a scenerio where a control plane and a forwarding plane of a gateway are separated appears at present, namely a gateway is divided into a unified gateway control plane UGW-C and a unified gateway forwarding plane UGW-U according to functionality, and an interface between the UGW-C and the UGW-U is defined as Sg. The UGW-C processes external signaling interaction, including interaction with an AAA server, interaction with a PCRF by using PCC signaling and the like. The UGW-C completes signaling negotiation and sends information needed for forwarding a data packet by the UGW-U (referred to as context information) to the UGW-U, and the UGW-U forwards user data packet according to the context information indicated by the UGW-C. Similar decoupling concept may be applied to an SGSN and a GGSN of a 2G/3G network or to an S-GW and a P-GW independent deployment device under the SAE architecture.

It is needed to consider that, under the scenario that the control plane and the forwarding plane of the gateway are separated, how to execute forwarding of a data packet when a gateway forwarding plane device loses context information corresponding to the data packet.

SUMMARY

Embodiments of the present invention provide a method and a device for processing information, so that a gateway forwarding plane device can ensure accurate forwarding of a data packet to the greatest extent under a condition that context information is lost.

In a first aspect, a method for processing information by a gateway forwarding plane device is provided. The method includes receiving a data packet, and extracting the data packet's characteristic information. The method also includes searching for context information corresponding to the data packet's characteristic information. The method also includes buffering or discarding the data packet if the context information is not found. The method also includes sending an event reporting message to a gateway control plane device, wherein the event reporting message carries the data packet's characteristic information, so that the gateway control plane device acquires the context information corresponding to the data packet's characteristic information.

In a first possible implementation, after sending the event reporting message to the gateway control plane device, a specific implementation may be: receiving the context information sent by the gateway control plane device; and forwarding the data packet according to the context information.

In a second possible implementation, after sending the event reporting message to the gateway control plane device, a specific implementation may be: receiving an instruction message sent by the gateway control plane device; and discarding, by the gateway forwarding plane device, the data packet and/or notifying a sending end of the data packet of occurrence of abnormity according to the instruction message.

In combination with the first aspect or the first possible implementation or second possible implementation of the first aspect, in a third possible implementation, before buffering or discarding the data packet, a specific implementation may be: judging whether a user equipment internet protocol (UE IP) address of the data packet is a user-subscribed static IP address.

According to the third possible implementation, in a fourth possible implementation, the discarding the data packet may be specifically implemented in: discarding the data packet if the UE IP address of the data packet is not a user-subscribed static IP address.

According to the third possible implementation, in a fifth possible implementation, after judging whether the UE IP address of the data packet is a user-subscribed static IP address, a specific implementation may be: notifying, if the UE IP address of the data packet is a user-subscribed static IP address, the gateway control plane device that the UE IP address of the data packet is a user-subscribed static IP address, so that the gateway control plane device initiates a network-triggered packet data network (PDN) connection establishment procedure.

In combination with the first aspect or any of the first to fifth possible implementations of the first aspect, in a sixth possible implementation, before the gateway forwarding plane device receives the data packet, a specific implementation may be: deleting part or all of context information stored by the gateway forwarding plane device.

According to the sixth possible implementation, in a seventh possible implementation, the deleting part or all of context information stored by the gateway forwarding plane device may be specifically implemented in: receiving a second message sent by a control plane device, and deleting part or all of context information stored by the gateway forwarding plane device according to the second message; or deleting, when the gateway forwarding plane device does not transmit any data packet of a UE within a predefined time period, part or all of context information of the UE stored by the gateway forwarding plane device.

According to the sixth possible implementation or the seventh possible implementation, in an eighth possible implementation, the deleting part of context information stored by the gateway forwarding plane device may be specifically implementated in: deleting part of the context information stored by the gateway forwarding plane device, wherein remaining context information at least comprising a UE IP address.

In a second aspect, a method for processing information by a gateway forwarding plane device is provided. The method includes receiving an event reporting message sent by a gateway forwarding plane device, wherein the event reporting message carries a data packet's characteristic information received by the gateway forwarding plane device. The method also includes acquiring context information corresponding to the data packet's characteristic information.

In a first possible implementation, the acquiring context information corresponding to the data packet's characteristic information may be specifically implemented in: triggering, when a user equipment (UE) corresponding to the data packet is in an Idle state, the UE to exit the Idle state; or judging, when the context information corresponding to the data packet's characteristic information is not found, whether a user equipment internet protocol (UE IP) address of the data packet is a user-subscribed static IP address, and initiating, by the gateway control plane device, a network-triggered packet data network (PDN) connection establishment procedure if the UE IP address of the data packet is a user-subscribed static IP address; or receiving, by the gateway control plane device, information about that a UE IP address of the data packet is a user-subscribed static IP address, that is sent by the gateway forwarding plane device, and initiating a network-triggered PDN connection establishment procedure.

In a second possible implementation, after acquiring the context information corresponding to the data packet's characteristic information, a specific implementation may be: sending the context information to the gateway forwarding plane device if the context information is acquired, so that the gateway forwarding plane device forwards the data packet according to the context information; and sending a first message to the gateway forwarding plane device if the context information is not acquired, wherein the first message is used for instructing the gateway forwarding plane device to discard the data packet and/or to notify a sending end of the data packet of occurrence of abnormity.

In combination with the second aspect or the first or second possible implementation of the second aspect, in a third possible implementation, before receiving the event reporting message sent by the gateway forwarding plane device, a specific implementation may be: sending a second message to the gateway forwarding plane device, wherein the second message is used for instructing the gateway forwarding plane device to delete part or all of context information stored by the gateway forwarding plane device.

According to the third possible implementation, in a fourth possible implementation, the sending a second message to the gateway forwarding plane device may be specifically implemented in: sending the second message to the gateway forwarding plane device when a UE does not exit an Idle state within a predefined time period, wherein the second message is used for instructing the gateway forwarding plane device to delete part or all of context information of the UE stored by the gateway forwarding plane device.

According to the third or fourth possible implementation, in a fifth possible implementation, the deleting part of context information stored by the gateway forwarding plane device may be specifically implemented in: deleting part of context information stored by the gateway forwarding plane device, wherein remaining context information at least comprising a UE IP address.

In a third aspect, a method for processing information by a gateway forwarding plane device is provided. The method includes receiving an error notification sent by a receiving end of a data packet. The method also includes sending an error event reporting message to a gateway control plane device, wherein the error event reporting message carries the data packet's characteristic information, so that the gateway control plane device releases a packet data network (PDN)

connection or initiates reestablishment according to the data packet's characteristic information.

In a first possible implementation, the sending an error event reporting message to gateway control plane device may be specifically implemented in: sending an error notification packet to the gateway control plane device.

In a fourth aspect, a method for processing information by a gateway forwarding plane device is provided. The method includes receiving an error event reporting message sent by a gateway forwarding plane device, wherein the error event reporting message carries a data packet's characteristic information. The method also includes releasing a packet data network (PDN) connection or initiating reestablishment according to the data packet's characteristic information.

In a first possible implementation, the receiving an error event reporting message sent by a gateway forwarding plane device may be specifically implemented in: receiving an error notification packet sent by the gateway forwarding plane device.

In a fifth aspect, a method for processing information by a gateway forwarding plane device is provided. The method includes receiving a data packet, and extracting the data packet's characteristic information; searching for context information corresponding to the data packet's characteristic information. The method also includes judging, if the context information is not found, whether a user equipment internet protocol (UE IP) address of the data packet is a user-subscribed static IP address. The method also includes discarding the data packet if the UE IP address of the data packet is not a user-subscribed static IP address.

In a sixth aspect, a gateway forwarding plane device is provided. The device includes a first receiving unit, configured to receive a data packet. The device also includes a processor, configured to extract the data packet's characteristic information received by the first receiving unit, and search for context information corresponding to the data packet's characteristic information. The device also includes a memory. The memory is configured to buffer the data packet received by the first receiving unit if the processor does not find the context information, or, the processor is further configured to discard the data packet received by the first receiving unit if the processor does not find the context information. The device also includes a second sending unit, configured to send an event reporting message to a gateway control plane device, wherein the event reporting message carries the data packet's characteristic information received by the first receiving unit, so that the gateway control plane device acquires the context information corresponding to the data packet's characteristic information.

In a first possible implementation, the gateway forwarding plane device further includes: a second receiving unit, configured to receive the context information sent by the gateway control plane device; and a first sending unit, configured to forward the data packet according to the context information received by the second receiving unit.

In a second possible implementation, the second receiving unit is further configured to receive an instruction message sent by the gateway control plane device; and the processor is further configured to discard the data packet according to the instruction message, and/or the first sending unit is further configured to notify a sending end of the data packet of occurrence of abnormality.

In combination with the sixth aspect or the first or second possible implementation of the sixth aspect, in a third possible implementation, the processor is further configured to judge whether a user equipment internet protocol (UE IP) address of the data packet is a user-subscribed static IP address.

According to the third possible implementation, in a fourth possible implementation, the processor is specifically configured to discard the data packet if the UE IP address of the data packet is not a user-subscribed static IP address.

According to the third possible implementation, in a fifth possible implementation, the second sending unit is further configured to notify, if the UE IP address of the data packet is a user-subscribed static IP address, the gateway control plane device that the UE IP address of the data packet is a user-subscribed static IP address, so that the gateway control plane device initiates a network-triggered packet data network (PDN) connection establishment procedure.

In combination with the sixth aspect or any one of the first to fifth possible implementations of the sixth aspect, in a sixth possible implementation, the processor is further configured to: delete part or all of context information stored by the memory of the gateway forwarding plane device.

According to the sixth possible implementation, in a seventh possible implementation, the processor is specifically configured to: delete part or all of context information stored by the gateway forwarding plane device according to a second message that is sent by the gateway control plane device and received by the second receiving unit; or delete, when the gateway forwarding plane device does not transmit any data packet of a UE within a predefined time period, part or all of context information of the UE stored by the gateway forwarding plane device.

According to the sixth or seventh possible implementation, in an eighth possible implementation, the processor is specifically configured to: delete part of the context information stored by the gateway forwarding plane device, wherein remaining context information at least comprising a UE IP address.

In a seventh aspect, a gateway control plane device is provided, including: a receiving unit, configured to receive an event reporting message sent by a gateway forwarding plane device, wherein the event reporting message carries a data packet's characteristic information received by the gateway forwarding plane device; and a processor, configured to acquire context information corresponding to the data packet's characteristic information received by the receiving unit.

In a first possible implementation, the processor is specifically configured to trigger, when a user equipment (UE) corresponding to the data packet is in an Idle state, the UE to exit the Idle state; or specifically configured to judge, when the context information corresponding to the data packet's characteristic information is not found, whether a user equipment internet protocol (UE IP) address of the data packet is a user-subscribed static IP address, and if the UE IP address of the data packet is a user-subscribed static IP address, the gateway control plane device initiates a network-triggered packet data network (PDN) connection establishment procedure; or specifically configured to initiate a network-triggered PDN connection establishment procedure when the receiving unit receives information about that the UE IP address of the data packet is a user-subscribed static IP address, that is sent by the gateway forwarding plane device.

In a second possible implementation, the sending unit is further configured to: send the context information to the gateway forwarding plane device if the processor acquires the context information, so that the gateway forwarding plane device forwards the data packet according to the context information; and send a first message to the gateway forwarding plane device if the processor does not acquire the context information, wherein the first message is used for instructing the gateway forwarding plane device to discard the data packet and/or to notify a sending end of the data packet of occurrence of abnormity.

In combination with the seventh aspect or the first or second possible implementation of the seventh aspect, in a third possible implementation, the sending unit is further configured to send a second message to the gateway forwarding plane device, wherein the second message is used for instructing the gateway forwarding plane device to delete part or all of context information stored by the gateway forwarding plane device.

According to the third possible implementation, in a fourth possible implementation, the sending unit is specifically configured to send the second message to the gateway forwarding plane device when a UE does not exit an Idle state within a predefined time period, wherein the second message is used for instructing the gateway forwarding plane device to delete part or all of context information of the UE stored by the gateway forwarding plane device.

In an eighth aspect, a gateway forwarding plane device is provided, including: a receiving unit, configured to receive an error notification sent by a receiving end of a data packet; and a sending unit, configured to send an error event reporting message to a gateway control plane device, wherein the error event reporting message carries the data packet's characteristic information, so that the gateway control plane device releases a packet data network (PDN) connection or initiates reestablishment according to the data packet's characteristic information.

In a first possible implementation, the sending unit is specifically configured to: send an error notification packet to the gateway control plane device.

In a ninth aspect, a gateway control plane device is provided. The device includes: a receiving unit, configured to receive an error event reporting message sent by a gateway forwarding plane device, wherein the error event reporting message carries a data packet's characteristic information. The device also includes a processor, configured to release a packet data network (PDN) connection or initiate reestablishment according to the data packet's characteristic information received by the receiving unit.

In a first possible implementation, the receiving unit is specifically configured to: receive an error notification packet sent by the gateway forwarding plane device.

In a tenth aspect, a gateway forwarding plane device is provided. The device includes a receiving unit, configured to receive a data packet. The device also includes a processor, configured to extract the data packet's characteristic information, search for context information corresponding to the data packet's characteristic information, judge, if the context information is not found, whether a user equipment internet protocol (UE IP) address of the data packet is a user-subscribed static IP address, and discard the data packet if the UE IP address of the data packet is not a user-subscribed static IP address.

According to the embodiments of the present invention, under the architecture that control and forwarding are decoupled, when the gateway forwarding plane device does not find the context information corresponding to the received data packet's characteristic information, the gateway forwarding plane device reports the received data packet's characteristic information to the gateway control plane device, so that the gateway control plane device acquires the context information. In this way, the gateway forwarding plane device can acquire context information to the greatest extent under the condition that the context information is lost, thereby ensuring accurate forwarding of the data packet to the greatest extent.

BRIEF DESCRIPTION OF THE DRAWINGS

To illustrate technical solutions in the embodiments of the present invention more clearly, a brief introduction on the accompanying drawings which are needed in the description of the embodiments or the prior art is given below. Apparently, the accompanying drawings in the description below are merely some of the embodiments of the present invention, based on which other accompanying drawings may be obtained by those of ordinary skill in the art without any creative effort.

DETAILED DESCRIPTION OF ILLUSTRATIVE EMBODIMENTS

The technical solutions in the embodiments of the present invention will be described below clearly and fully in combination with the accompanying drawings in the embodiments of the present invention. Apparently, the embodiments described below are merely a part, but not all, of the embodiments of the present invention. All of other embodiments, obtained by those skilled in the art based on the embodiments of the present invention without any inventive effort, fall into the protection scope of the present invention.

The technical solutions of the present invention may be applied to various communication systems, e.g., a global system of mobile communication (GSM), a code division multiple access (CDMA) system, a wideband code division multiple access wireless (WCDMA), a general packet radio service (GPRS), a long term evolution (LTE) and the like.

A user equipment (UE), also be referred to as a mobile station, a mobile user equipment and the like, may communicate with one or more core networks through a radio access network (e.g., RAN). The user equipment may be a mobile station, such as, for example, a mobile phone (or referred to as a "cell" phone) and be a computer with a mobile station, such as, for example, a portable, pocket-type, handheld, computer built-in or vehicle-mounted mobile apparatus, and they exchange language and/or data with a radio access network.

A control plane device may be a control plane GW-C of a P-GW (PDN Gateway)/S-GW (Serving Gateway) under an SAE architecture of a 3GPP evolved network, and a forwarding plane device may be a forwarding plane GW-U of the P-GW/S-GW. It should be noted that, the embodiments of the present invention are not limited thereto. The gateway control plane device and the gateway forwarding plane device may be a control plane device and a forwarding plane device after decoupling of control and forwarding of an RNC (Radio Network Controller), an SGSN (Serving GPRS Support Node) and a GGSN (Gateway GPRS Support Node) in a GPRS (General Packet Radio Service) network, or an evolved base station (eNodeB), an S-GW (Serving Gateway), a P-GW (Packet Data Network Gateway), an S-GW/P-GW integrated device in an EPS (Evolved Packet System) network and the like.

Figure 1:
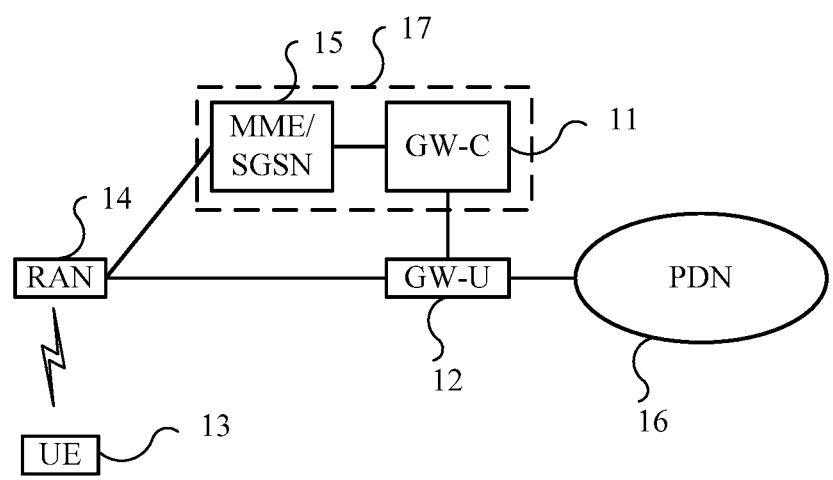
FIG. 1 is a schematic structural diagram of a communication system applicable to a gateway system of an embodiment of the present invention.

FIG. 1 is a schematic structural diagram of a communication system applicable to a gateway system of an embodiment of the present invention. For purpose of briefness, only one gateway control plane device (GW-C) 11 and one gateway forwarding plane device (GW-U) 12 of a group of gateway system are illustrated in the communication system of FIG. 1. However, in the communication system of the embodiment of the present invention, no limitation is set to the number of the gateway system(s), number of the gateway control plane device(s) and the number of the gateway forwarding plane device(s).

Moreover, the communication system of FIG. 1 may further include a UE 13, an RAN 14, a mobility management network element 15, a PDN 16 and the like. The embodiment of the present invention does not set limitation to the numbers of these network elements either.

The RAN 14 may include an access network element of various systems (e.g., GERAN, UTRAN or E-UTRAN), such as, for example, an RNC, an eNodeB and the like. The PDN 16 may be in form of WAP, Internet, VPN and the like, which is not limited by the embodiment of the present invention.

Alternatively, as one embodiment, the gateway control plane device 11 may be implemented with a general computing platform, and the gateway forwarding plane device 12 may be implemented by a dedicated router platform. The general computing platform is suitable for processing interface signaling; and signaling processing capability of the dedicated router platform is relatively poor, but data forwarding efficiency of the dedicated router platform is relatively high. In this way, design of a hardware platform can be simplified, cost of the hardware platform is reduced, and processing performances of a gateway control plane entity and a user plane entity are greatly enhanced.

The mobility management network element 15 may be an MME and/or an SGSN, and may be implemented with a general computing platform. Accordingly, as another embodiment, the gateway control plane device 11 and the mobility management network element 15 may be integrated together, as shown in a dashed box 17 of FIG. 1, so as to reduce the number of network elements in the system.

In the embodiment of FIG. 1, a wireless link between the UE 13 and the RAN 14, a connection between the RAN 14 and the GW-U 12 and a connection between the GW-U 12 and the PDN 16 constitute a data path of the UE 13. However, the data path of the UE 13 is not limited to a specific form like this. For instance, the data path may be a connection or a tunnel between the RAN and the GW-U or between the GW-U and other gateway used for forwarding data of the UE, such as, for example, a GTP tunnel, a GRE connection, a service data stream and the like. The data path may be in a bearer granularity, a service data stream granularity or a user granularity. The data path may also be a data connection between a user plane gateway and a VPN of a PDN.

The GW-C 11 may also be referred to as a control plane entity or a control plane gateway, or referred to as a gateway controller, a control node, a control gateway or the like. The embodiment of the present invention does not set limitation to a specific name of the GW-C 11, as long as it is capable of realizing control plane functionality of a gateway and is decoupled with the GW-U 12.

In addition, the GW-U 12 may also be referred to as a user plane entity or a user plane gateway, or referred to as a packet data forwarding gateway, a routing forwarding node, a switch node or the like. The embodiment of the present invention does not set limitation to a specific name of the GW-U 12, as long as it is capable of realizing user plane functionality of a gateway and is decoupled with the GW-C 11.

Figure 2:
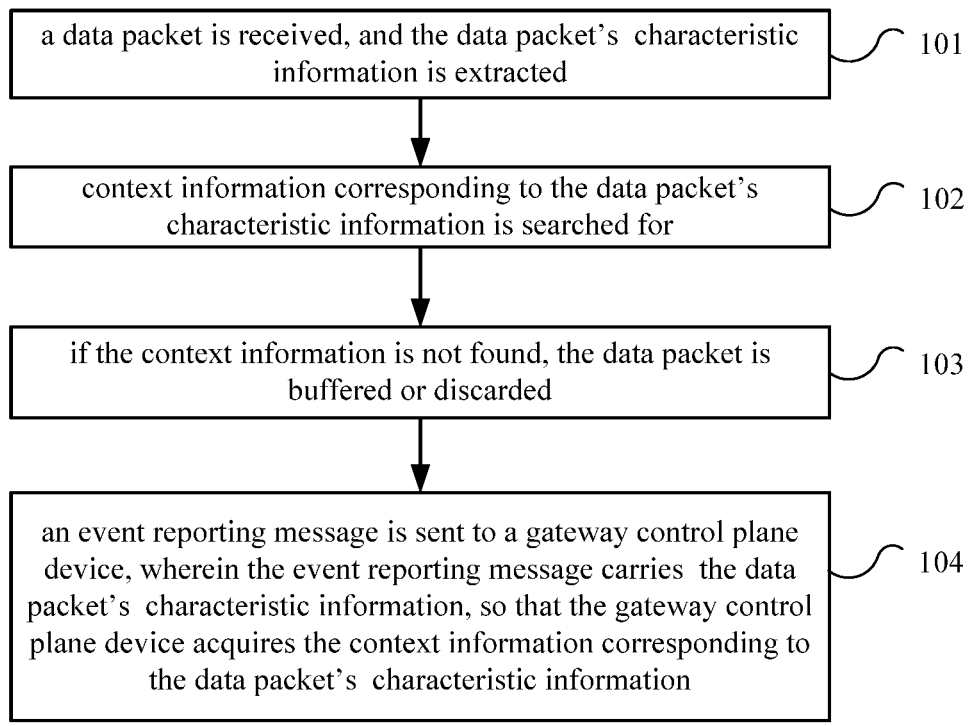
FIG. 2 is a flowchart of a method for processing information by a gateway forwarding plane device of an embodiment of the present invention.

FIG. 2 is a flowchart of a method for processing information by a gateway forwarding plane device of an embodiment of the present invention. The method of FIG. 2 is executed by a gateway forwarding plane device (e.g., the GW-U 12 of FIG. 1).

101, a data packet is received, and the data packet's characteristic information is extracted.

102, context information corresponding to the data packet's characteristic information is searched for.

103, if the context information is not found, the data packet is buffered or discarded.

104, an event reporting message is sent to a gateway control plane device, wherein the event reporting message carries the data packet's characteristic information, so that the gateway control plane device acquires the context information corresponding to the data packet's characteristic information.

The embodiment of the present invention may be applied to conditions that a UE is in an Idle state, a UE is configured with a static IP address, a local end is abnormal and the like. It should be appreciated that the present invention does not set limitation to a condition to which the method is applied.

It should be further understood that, the embodiment of the present invention does not set limitation to the number of the gateway forwarding plane devices and the number of the gateway control plane devices, e.g., one gateway forwarding plane device may correspond to at least one gateway control plane device.

According to the embodiment of the present invention, under the architecture that control and forwarding are decoupled, when the gateway forwarding plane device does not find the context information corresponding to the received data packet's characteristic information, the gateway forwarding plane device reports the received data packet's characteristic information to the gateway control plane device, so that the gateway control plane device acquires the context information. In this way, the gateway forwarding plane device can acquire context information to the greatest extent under the condition that the context information is lost, thereby ensuring accurate forwarding of the data packet to the greatest extent.

Alternatively, as one embodiment, the data packet received by the gateway forwarding plane device may be an uplink data packet and/or a downlink data packet. It should be understood that the embodiment of the present invention does not set limitation to a specific form of the data packet received by the gateway forwarding plane device.

Specifically, the gateway forwarding plane device receives a packet, such as, for instance, a common IP packet, a GTP (GPRS Tunneling Protocol) packet, a PMIP (Proxy Mobile IP) packet, an MIP (Mobile IP) packet, a GRE (Generic Route Encapsulation) packet, an L2TP (Layer 2 Tunnelling Protocol) packet or the like.

Alternatively, as another embodiment, the data packet's characteristic information includes an APN (Access Point Name), a UE IP address, tunnel information or the like. For example, tunnel information of a GTP packet includes a gateway IP address and a TEID (Tunnel End Identifier, GTP tunnel end identifier). For another example, tunnel information of a PMIP packet includes a gateway IP address and a GRE key (Generic Routing Encapsulation).

Alternatively, as another embodiment, after step 104, if the gateway control plane device acquires the context information, the gateway forwarding plane device may receive the context information sent by the gateway control plane device, and forward the data packet according to the context information.

Alternatively, as another embodiment, after step 104, if the gateway control plane device does not acquire the context information, the gateway forwarding plane device may receive an instruction message sent by the gateway control plane device, and discard the data packet and/or notify a sending end of the data packet of occurrence of abnormality according to the instruction message.

Alternatively, as another embodiment, before step 103, it may be judged whether a user equipment internet protocol (UE IP) address of the data packet is a user-subscribed static IP address. Further, in step 103, if the UE IP address of the data packet is not a user-subscribed static IP address, the data packet is discarded. Alternatively, the procedure may be ended at the moment. In this way, signaling interaction between the gateway forwarding plane device and the gateway control plane device may be effectively reduced. Or, if the UE IP address of the data packet is a user-subscribed static IP address, the gateway control plane device is notified that the UE IP address of the data packet is a user-subscribed static IP address, so that the gateway control plane device initiates a network-triggered PDN (Packet Data Network) connection establishment procedure.

Alternatively, as another embodiment, before step 101, the gateway forwarding plane device may delete part or all of stored context information. For example, the gateway forwarding plane device receives a second message sent by the gateway control plane device, and deletes part or all of context information stored by the gateway forwarding plane device according to the second message. For another example, when the gateway forwarding plane device does not transmit any data packet of a UE within a predefined time period, part or all of context information of the above-mentioned UE stored by the gateway forwarding plane device is deleted. In this way, resources of the gateway forwarding plane device are saved, and cost is reduced.

In the embodiment of the present invention, part or all of the context information may be lost due to failure of the gateway forwarding plane device. It should be understood that, no matter in which manner all or part of the context information is deleted by the gateway forwarding plane device, it shall fall into the scope of the embodiment of the present invention. It also should be noted that, the embodiment of the present invention does not set limitation to a reason the gateway forwarding plane device fails to find the context information.

Further, part of the context information stored by the gateway forwarding plane device is deleted, and remaining context information at least includes a UE IP address. Alternatively, it may be judged whether the UE IP address of the data packet is a UE IP address in the remaining context information. In step 103, if the UE IP address of the data packet is not a UE IP address in the remaining context information, the data packet is discarded. Alternatively, the procedure may be ended at the moment. In this way, signaling interaction between the gateway forwarding plane device and the gateway control plane device can be effectively reduced.

Moreover, in existing network architecture, under conditions that a UE is in an Idle state, a UE is configured with a static IP address and a local end is abnormal, methods for processing context information are different from each other. Under a condition that an opposite end is abnormal, a gateway also has multiple different processing procedures. Therefore, processing of a device is relatively complex.

In the embodiment of the present invention, information processing under the conditions that a UE is in an Idle state, a UE is configured with a static IP address, a local end is abnormal and the like, is normalized to the greatest extent, namely a same processing mechanism may be adopted. Therefore, it is unnecessary to maintain complex service logics, and processing complexity of a device is reduced.

Non-limited examples of a method, for processing information under the architecture that control and forwarding of a gateway device are decoupled, of the embodiment of the present invention will be described in more detail below in combination with FIG. 4 to FIG. 11.

Figure 3:
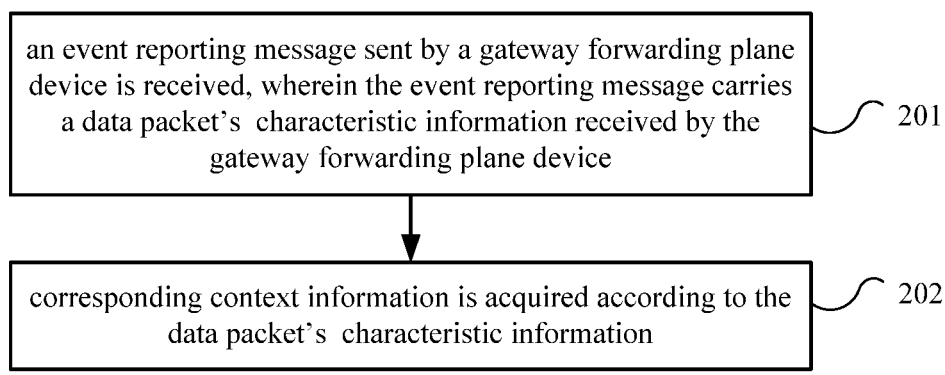
FIG. 3 is a flowchart of a method for processing information by a gateway forwarding plane device of another embodiment of the present invention.

FIG. 3 is a flowchart of a method for processing information by a gateway forwarding plane device of another embodiment of the present invention. The method of FIG. 3 is executed by a gateway control plane device (e.g., the GW-C 11 of FIG. 1).

201, an event reporting message sent by a gateway forwarding plane device is received, wherein the event reporting message carries a data packet's characteristic information received by the gateway forwarding plane device.

202, corresponding context information is acquired according to the data packet's characteristic information.

The embodiment of the present invention may be applied to conditions that a UE is in an Idle state, a UE is configured with a static IP address, a local end is abnormal and the like. It should be appreciated that the present invention does not set limitation to a condition to which the method is applied.

It should be further understood that, the embodiment of the present invention does not set limitation to the number of the gateway forwarding plane devices and the number of the gateway control plane devices, e.g., one gateway forwarding plane device may correspond to at least one gateway control plane device.

According to the embodiment of the present invention, under the architecture that control and forwarding are decoupled, when the gateway forwarding plane device does not find the context information corresponding to the received data packet's characteristic information, the gateway forwarding plane device reports the received data packet's characteristic information to the gateway control plane device, so that the gateway control plane device acquires the context information. In this way, the gateway forwarding plane device can acquire context information to the greatest extent under the condition that the context information is lost, thereby ensuring accurate forwarding of the data packet to the greatest extent.

According to the embodiment of the present invention, under the architecture that control and forwarding are decoupled, the gateway forwarding plane device searches for the context information corresponding to the received data packet's characteristic information, and if the search fails, the gateway forwarding plane device sends the event reporting message to the gateway control plane device, wherein the event reporting message carries the data packet's characteristic information. The gateway control plane device acquires corresponding context information. In this way, information processing under the conditions that a UE is in an Idle state, a UE is configured with a static IP address, a local end is abnormal and the like, is normalized to the greatest extent. Therefore, it is unnecessary to maintain complex service logics, and processing complexity of a device is reduced.

Alternatively, as one embodiment, the data packet may be a GTP packet, a PMIP packet or the like. It should be understood that the present invention does not set limitation to specific form of the data packet.

Alternatively, as another embodiment, the data packet's characteristic information includes an APN, a UE IP address, tunnel information or the like. For example, tunnel information of a GTP packet includes a gateway IP address and a TEID. For another example, tunnel information of a PMIP packet includes a gateway IP address and a GRE key.

Alternatively, as another embodiment, in step 202, corresponding context information is acquired according to the data packet's characteristic information. Specifically, when a user equipment (UE) corresponding to the data packet is in an Idle state, the UE is triggered to exit the Idle state; or, when the context information is not found according to the data packet's characteristic information, it is judged whether a user equipment internet protocol (UE IP) address of the data packet is a user-subscribed static IP address, and if the UE IP address of the data packet is a user-subscribed static IP address, the gateway control plane device initiates a network-triggered PDN connection establishment procedure; or, the gateway control plane device receives information about that a UE IP address of the data packet is a user-subscribed static IP address, that is sent by the gateway forwarding plane device, and initiates a network-triggered PDN connection establishment procedure. Further, the context information is acquired, and may be sent to the gateway forwarding plane device, so that the gateway forwarding plane device forwards the data packet according to the context information.

Alternatively, as another embodiment, in step 202, if the context information is not acquired, a first message may be sent to the gateway forwarding plane device, wherein the first message is used for instructing the gateway forwarding plane device to discard the data packet and/or to notify a sending end of the data packet of occurrence of abnormity.

Alternatively, as another embodiment, before step 201, a second message may be sent to the gateway forwarding plane device, wherein the second message is used for instructing the gateway forwarding plane device to delete part or all of context information stored by the gateway forwarding plane device. Specifically, when a UE does not exit an Idle state within a predefined time period, the gateway control plane device sends the second message to the gateway forwarding plane device, wherein the second message is used for instructing the gateway forwarding plane device to delete part or all of context information of the above-mentioned UE stored by the gateway forwarding plane device. In this way, resources of the gateway forwarding plane device are saved, and cost is reduced.

It should be understood that, no matter in which manner all or part of the context information is deleted by the gateway forwarding plane device, it shall fall into the scope of the embodiment of the present invention.

Further, the gateway control plane device instructs the gateway forwarding plane device to delete part of the context information stored by the gateway forwarding plane device, wherein remaining context information at least includes a UE IP address.

Moreover, in existing network architecture, under conditions that a UE is in an Idle state, a UE is configured with a static IP address and a local end is abnormal, methods for processing context information are different from each other. Under a condition that an opposite end is abnormal, a gateway also has multiple different processing procedures. Therefore, processing of a device is relatively complex.

In the embodiment of the present invention, information processing under the conditions that a UE is in an Idle state, a UE is configured with a static IP address, a local end is abnormal and the like, is normalized to the greatest extent, namely a same processing mechanism may be adopted. Therefore, it is unnecessary to maintain complex service logics, and processing complexity of a device is reduced.

The embodiment of the present invention will be described in detail below in combination with specific examples. In FIG. 4 to FIG. 11 below, the gateway control plane device may be a unified gateway control plane UGW-C under SAE architecture of a 3GPP evolved network, and the gateway forwarding plane device may be a unified gateway forwarding plane UGW-U. It should be noted that the embodiment of the present invention is not limited thereto, and they may be gateway devices of which control and forwarding are decoupled of other network. It should be further understood that the embodiment of the present invention does not set limitation to the number of the gateway forwarding plane devices and the number of the gateway control plane devices, e.g., one gateway forwarding plane device may correspond to at least one gateway control plane device. FIG. 4 to FIG. 11 are schematic flowcharts of processes of a method for processing information under the architecture that control and forwarding are decoupled in the embodiment of the present invention, which is applicable to the gateway system of FIG. 1.

Figure 4:
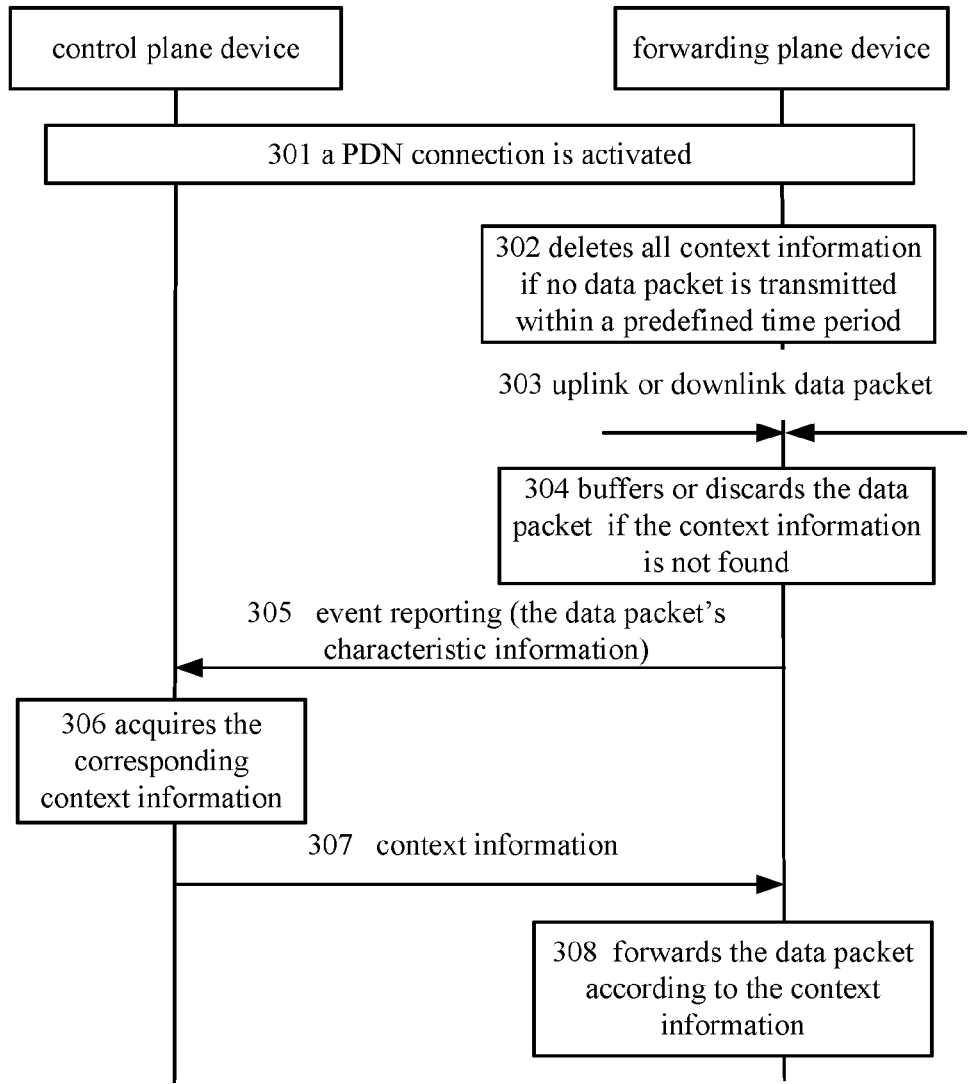
FIG. 4 is a schematic flowchart of a process of a method for processing information under architecture that control and forwarding gateway device are decoupled of an embodiment of the present invention.

FIG. 4 is a schematic flowchart of a process of a method for processing information under the architecture that control and forwarding are decoupled of an embodiment of the present invention.

The method of FIG. 4 may be applied to conditions that a UE is in an Idle state, a UE is configured with a static IP address, a local end is abnormal and the like. It should be appreciated that the present invention does not set limitation to a condition to which the method is applied.

301, a PDN connection is activated.

302, if a gateway forwarding plane device does not transmit any data packet of a UE within a predefined time period, all context information of the UE is deleted.

For example, the gateway forwarding plane device may pre-configure a time period threshold, or the gateway forwarding plane device receives a time period threshold sent by a gateway control plane device. When an amount of time in which the gateway forwarding plane device does not transmit any data packet of the UE exceeds the time period threshold, the gateway forwarding plane device deletes all of the stored context information of the UE. In this way, resources of the gateway forwarding plane device are saved, and cost is reduced.

303, the gateway forwarding plane device receives an uplink or a downlink data packet.

For example, the gateway forwarding plane device receives a downlink data packet, such as a common IP packet, a GTP (GPRS Tunneling Protocol) packet a PMIP (Proxy Mobile IP) packet, an MIP (Mobile IP) packet, a GRE (Generic Route Encapsulation) packet, an L2TP (Layer 2 Tunnelling Protocol) packet or the like.

304, the gateway forwarding plane device searches for context information corresponding to the data packet's characteristic information, and buffers or discards the data packet if the search fails.

The data packet's characteristic information may include an APN, a UE IP address, tunnel information or the like. For example, tunnel information of a GTP packet includes a gateway IP address and a TEID. For another example, tunnel information of a PMIP packet includes a gateway IP address and a GRE key.

For example, since the gateway forwarding plane device has deleted the context information of the UE, the corresponding context information is not found, namely the search fails. At the moment, the gateway forwarding plane device may buffer the data packet or discard the data packet.

Alternatively, the gateway forwarding plane device may further judge whether a UE IP address of the received data packet is a user-subscribed static IP address according to a list of static IP addresses. For example, the list of static IP addresses may be configured by an administrator, including configuring locally or configuring remotely. If the UE IP address is not a user-subscribed static IP address, the data packet is discarded. Alternatively, the procedure may be ended at the moment. In this way, signaling interaction between the forwarding plane device and the control plane device may be effectively reduced.

305, the gateway forwarding plane device sends an event reporting message to the gateway control plane device, wherein the event reporting message carries the data packet's characteristic information.

Alternatively, the gateway forwarding plane device may also send a judgment result of whether the UE IP address of the data packet is a user-subscribed static IP address to the gateway control plane device. For example, if the UE IP address of the data packet belongs to the list of static IP addresses, then the UE IP address of the data packet is a user-subscribed static IP address, and the gateway forwarding plane device sends information about that the UE IP address is a user-subscribed static IP address to the gateway control plane device.

306, the gateway control plane device acquires the corresponding context information.

Alternatively, in one implementation manner, the gateway control plane device acquires the corresponding context information, and step 307 is executed. For example, when a UE corresponding to the data packet's characteristic information received by the network control plane device in step 305 is in an Idle state, the gateway control plane device may trigger the UE to exit the Idle state. Specifically, a service request triggered by network is initiated. Or, when the gateway control plane device searches for the corresponding context information according to the data packet's characteristic information received in step 305, and the search fails, it is judged whether a UE IP address of the data packet is a user-subscribed static IP address, and if the UE IP address of the data packet is a user-subscribed static IP address, the control plane device initiates a network-triggered packet data network (PDN) connection establishment procedure. Or, the gateway control plane device receives information about that a UE IP address of the data packet is a user-subscribed static IP address, that is sent by the gateway forwarding plane device, and initiates a network-triggered PDN connection establishment procedure.

In another implementation manner, when the gateway control plane device does not acquire the corresponding context information, e.g., the gateway control plane device searches for the context information according to the data packet's characteristic information received in step 305, and the search fails, and further, if it is judged that the UE IP address of the data packet is not a user-subscribed static IP address, the gateway control plane device may send an instruction message to the gateway forwarding plane device, wherein the instruction message is used for instructing the gateway forwarding plane device to discard the data packet and/or to notify a sending end of the data packet of occurrence of abnormity.

307, the gateway control plane device sends the acquired context information to the gateway forwarding plane device.

308, the gateway forwarding plane device forwards the data packet according to the context information.

According to the embodiment of the present invention, under the architecture that control and forwarding are decoupled, when the gateway forwarding plane device does not find the context information corresponding to the received data packet's characteristic information, the gateway forwarding plane device reports the received data packet's characteristic information to the gateway control plane device, so that the gateway control plane device acquires the context information. In this way, the gateway forwarding plane device can acquire context information to the greatest extent under the condition that the context information is lost, thereby ensuring accurate forwarding of the data packet to the greatest extent.

Moreover, information processing under the conditions that a UE is in an Idle state, a UE is configured with a static IP address, a local end is abnormal and the like, is normalized to the greatest extent, namely a same processing mechanism may be adopted. Therefore, it is unnecessary to maintain complex service logics, and processing complexity of a device is reduced.

Figure 5:
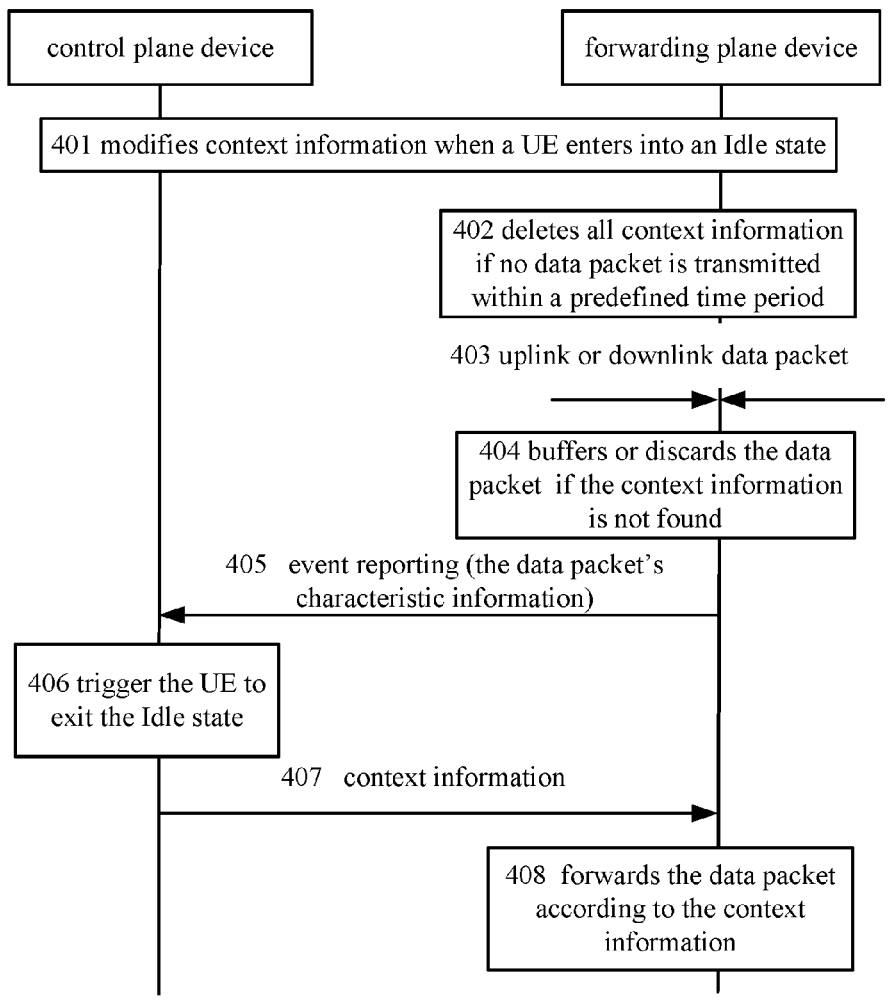
FIG. 5 is a schematic flowchart of a process of a method for processing information under architecture that control and forwarding gateway device are decoupled of another embodiment of the present invention.

FIG. 5 is a schematic flowchart of a process of a method for processing information of another embodiment of the present invention.

The method of FIG. 5 is applied to the condition that a UE is in an Idle state. It should be understood that the embodiment of the present invention does not limit the condition such as a UE is configured with a static IP address, a local end is abnormal and the like.

401, a gateway control plane device modifies context information when a UE enters into an Idle state or after a UE enters into an Idle state for a period of time.

Alternatively, a gateway control plane device may instruct the gateway forwarding plane device to modify related context information.

402, if the gateway forwarding plane device does not transmit any data packet of the UE within a predefined time period, the gateway forwarding plane device deletes all context information of the UE.

For example, the gateway forwarding plane device may pre-configure a time period threshold, or the gateway forwarding plane device receives a time period threshold sent by a gateway control plane device. When an amount of time in which the gateway forwarding plane device does not transmit any data packet of the UE exceeds the time period threshold, the gateway forwarding plane device deletes all of the stored context information of the UE. In this way, resources of the gateway forwarding plane device are saved, and cost is reduced.

403, the gateway forwarding plane device receives an uplink or a downlink data packet.

For example, the gateway forwarding plane device receives a downlink data packet, such as a GTP packet or a PMIP packet.

404, the gateway forwarding plane device searches for context information corresponding to the data packet's characteristic information, and buffers or discards the data packet if the search fails.

The data packet's characteristic information includes an APN, a UE IP address, tunnel information or the like. For example, tunnel information of a GTP packet includes a gateway IP address and a TEID. For another example, tunnel information of a PMIP packet includes a gateway IP address and a GRE key.

For example, since the gateway forwarding plane device has deleted the context information of the UE, the corresponding context information is not found, namely the search fails. At the moment, the gateway forwarding plane device may buffer the data packet or discard the data packet.

Alternatively, the gateway forwarding plane device may further judge whether a UE IP address of the received data packet is a user-subscribed static IP address according to a list of static IP addresses. For example, the list of static IP addresses may be configured by an administrator, including configuring locally or configuring remotely. If the UE IP address is not a user-subscribed static IP address, the data packet is discarded. Alternatively, the procedure may be ended at the moment. In this way, signaling interaction between the forwarding plane device and the control plane device may be effectively reduced.

405, the gateway forwarding plane device sends an event reporting message to the gateway control plane device, wherein the event reporting message carries the data packet's characteristic information.

Alternatively, the gateway forwarding plane device may also send a judgment result of whether the UE IP address of the data packet is a user-subscribed static IP address to the gateway control plane device. For example, if the UE IP address of the data packet belongs to the list of static IP addresses, then the UE IP address of the data packet is a user-subscribed static IP address, and the gateway forwarding plane device sends information about that the UE IP address is a user-subscribed static IP address to the gateway control plane device.

406, the gateway control plane device triggers the UE to exit the Idle state.

Alternatively, in one implementation manner, the gateway control plane device acquires the corresponding context information, and step 407 is executed. For example, when a UE corresponding to the data packet's characteristic information received by the network control plane device in step 405 is in an Idle state, the gateway control plane device may trigger the UE to exit the Idle state. For example, the gateway control plane device initiates a network-triggered service request procedure.

In another implementation manner, when the gateway control plane device does not acquire the corresponding context information, the gateway control plane device may send an instruction message to the gateway forwarding plane device, wherein the instruction message is used for instructing the gateway forwarding plane device to discard the data packet and/or to notify a sending end of the data packet of occurrence of abnormity.

407, the gateway control plane device sends the acquired context information to the gateway forwarding plane device.

408, the gateway forwarding plane device forwards the data packet according to the context information.

According to the embodiment of the present invention, under the architecture that control and forwarding are decoupled, when the UE is in an Idle state, and the g gateway forwarding plane device does not transmit any data packet of the UE, the g gateway forwarding plane device deletes all context information, thereby saving resources. When the gateway forwarding plane device does not find the context information corresponding to the received data packet's characteristic information, the gateway forwarding plane device reports the received data packet's characteristic information to the gateway control plane device, so that the gateway control plane device acquires the context information. In this way, the gateway forwarding plane device can acquire context information to the greatest extent under the condition that the context information is lost, thereby ensuring accurate forwarding of the data packet to the greatest extent.

Moreover, information processing under the conditions that a UE is in an Idle state, a UE is configured with a static IP address, a local end is abnormal and the like, is normalized to the greatest extent, namely a same processing mechanism may be adopted. Therefore, it is unnecessary to maintain complex service logics, and processing complexity of a device is reduced.

Figure 6:
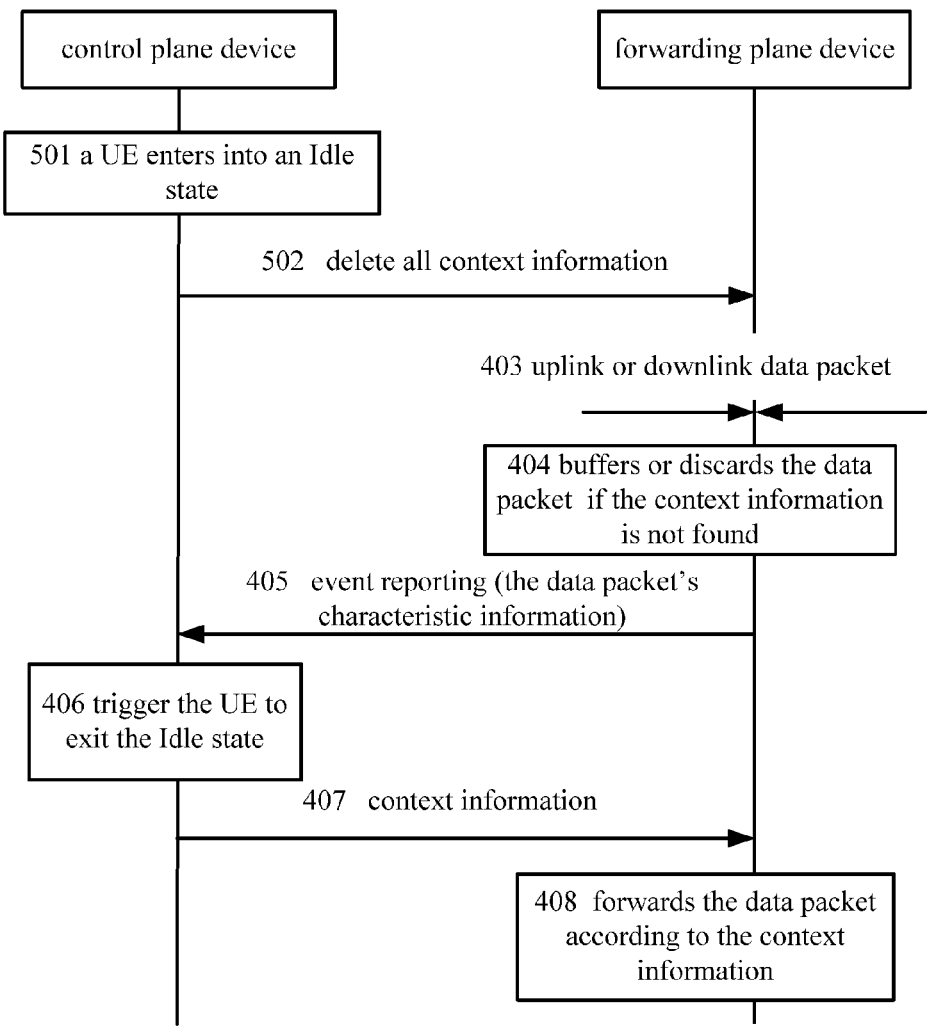
FIG. 6 is a schematic flowchart of a process of a method for processing information under architecture that control and forwarding gateway device are decoupled of another embodiment of the present invention.

FIG. 6 is a schematic flowchart of a process of a method for processing information under the architecture that control and forwarding are decoupled of another embodiment of the present invention.

In the schematic flowchart shown in FIG. 6, the steps which are the same as or similar to those in FIG. 4 are indicated by same reference signs, and thus are not redundantly described herein so as to avoid repetition. The method of FIG. 5 is applied to the condition that a UE is in an Idle state. It should be understood that, the embodiment of the present invention does not limit the condition such as a UE is configured with a static IP address, a local end is abnormal and the like.

501, a gateway control plane device modifies context information when a UE enters into an Idle state.

Alternatively, a gateway control plane device may instruct the gateway forwarding plane device to modify related context information.

502, the gateway control plane device instructs the gateway forwarding plane device to delete all context information of the UE stored by the gateway forwarding plane device.

For example, the gateway control plane device may send a second message to the gateway forwarding plane device, wherein the second message is used for instructing the gateway forwarding plane device to delete all of stored context information of the UE. Further, the gateway control plane device may pre-configure a time period threshold, and send the above-mentioned second message to the gateway forwarding plane device when an amount of time in which the UE does not exit the Idle state exceeds the time period threshold. In this way, resources of the gateway forwarding plane device are saved, and cost is reduced.

According to the embodiment of the present invention, under the architecture that control and forwarding are decoupled, when the gateway forwarding plane device does not find the context information corresponding to the received data packet's characteristic information, the gateway forwarding plane device reports the received data packet's characteristic information to the gateway control plane device, so that the gateway control plane device acquires the context information. In this way, the gateway forwarding plane device can acquire context information to the greatest extent under the condition that the context information is lost, thereby ensuring accurate forwarding of the data packet to the greatest extent.

Moreover, information processing under the conditions that a UE is in an Idle state, a UE is configured with a static IP address, a local end is abnormal and the like, is normalized to the greatest extent, namely a same processing mechanism may be adopted. Therefore, it is unnecessary to maintain complex service logics, and processing complexity of a device is reduced.

Figure 7:
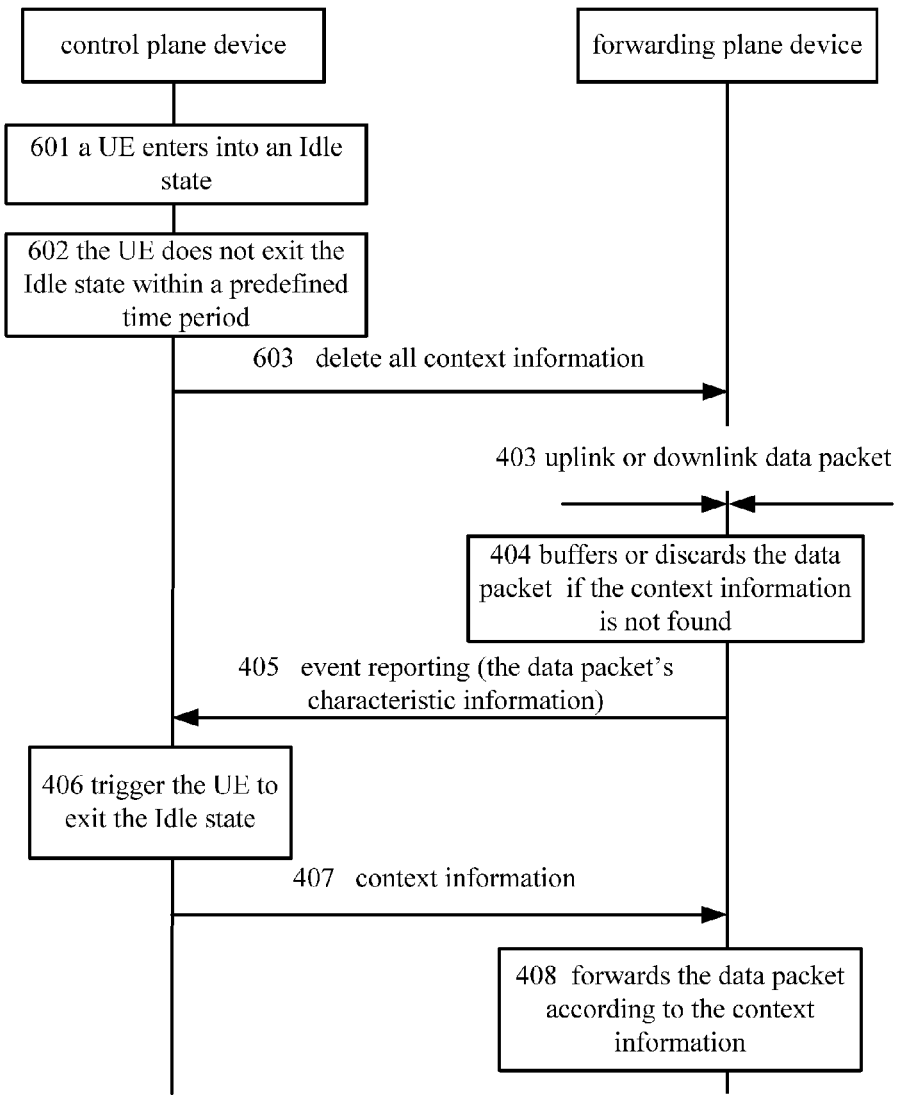
FIG. 7 is a schematic flowchart of a process of a method for processing information under architecture that control and forwarding gateway device are decoupled of another embodiment of the present invention.

FIG. 7 is a schematic flowchart of a process of a method for processing information under the architecture that control and forwarding are decoupled of another embodiment of the present invention.

In the schematic flowchart shown in FIG. 7, the steps which are the same as or similar to those in FIG. 5 are indicated by same reference signs, and thus are not redundantly described herein so as to avoid repetition. The method of FIG. 7 is applied to the condition that a UE is in an Idle state. It should be understood that, the embodiment of the present invention does not limit the condition such as a UE is configured with a static IP address, a local end is abnormal and the like.

601, a gateway control plane device modifies context information after a UE enters into an Idle state for a period of time.

Alternatively, the gateway control plane device may instruct a gateway forwarding plane device to modify corresponding context information.

602, the UE does not exit the Idle state within a predefined time period.

603, the gateway control plane device instructs the gateway forwarding plane device to delete all context information of the UE stored by the gateway forwarding plane device.

For example, the gateway control plane device may pre-configure a time period threshold, and send a second message to the gateway forwarding plane device when an amount of time in which UE does not exit the Idle state exceeds the time period threshold, wherein the second message is used for instructing the gateway forwarding plane device to delete all context information of the UE stored by the gateway forwarding plane device. In this way, resources of the gateway forwarding plane device are saved, and cost is reduced.

According to the embodiment of the present invention, under the architecture that control and forwarding are decoupled, when the gateway forwarding plane device does not find the context information corresponding to the received data packet's characteristic information, the gateway forwarding plane device reports the received data packet's characteristic information to the gateway control plane device, so that the gateway control plane device acquires the context information. In this way, the gateway forwarding plane device can acquire context information to the greatest extent under the condition that the context information is lost, thereby ensuring accurate forwarding of the data packet to the greatest extent.

Moreover, information processing under the conditions that a UE is in an Idle state, a UE is configured with a static IP address, a local end is abnormal and the like, is normalized to the greatest extent, namely a same processing mechanism may be adopted. Therefore, it is unnecessary to maintain complex service logics, and processing complexity of a device is reduced.

Figure 8:
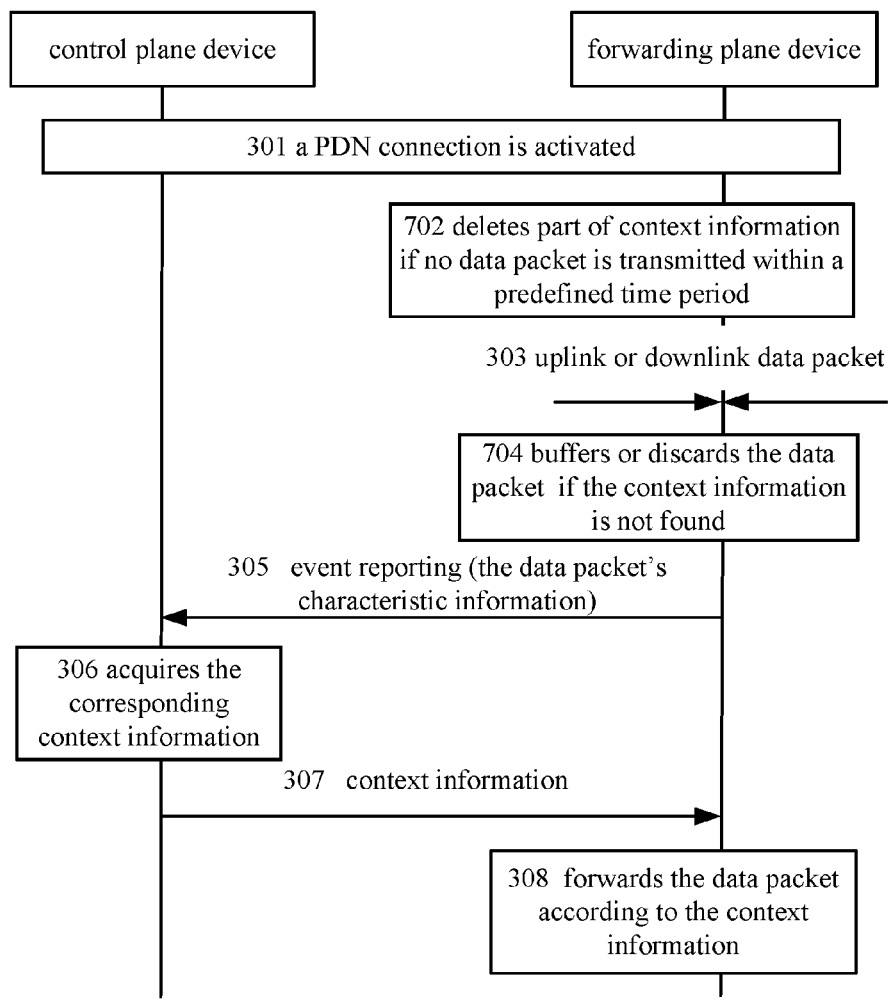
FIG. 8 is a schematic flowchart of a process of a method for processing information under architecture that control and forwarding gateway device are decoupled of another embodiment of the present invention.

FIG. 8 is a schematic flowchart of a process of a method for processing information under the architecture that control and forwarding are decoupled of another embodiment of the present invention.

In the schematic flowchart shown in FIG. 8, the steps which are the same as or similar to those in FIG. 4 are indicated by same reference signs, and thus are not redundantly described herein for avoiding repetition. The method of FIG. 8 may be applied to conditions that a UE is in an Idle state, a UE is configured with a static IP address, a local end is abnormal and the like. It should be understood that the present invention does not set limitation to a condition to which the method is applied.

702, a gateway forwarding plane device does not transmit any data packet within a predefined time period, and deletes part of context information.

For example, the gateway forwarding plane device may pre-configure a time period threshold or the forwarding plane device receives a time period threshold sent by a control plane device, and when an amount of time in which the gateway forwarding plane device transmit any data packet of a UE exceeds the time period threshold, the gateway forwarding plane device deletes part of the context information. In this way, resources of the gateway forwarding plane device are saved, and cost is reduced. Further, remaining part of the context information which is not deleted at least includes a UE IP address. Alternatively, the remaining part of the context information may further include an access point name (APN) and tunnel information. Further, if one gateway forwarding plane device corresponds to multiple gateway control plane devices, at least one gateway control plane device IP address may be further reserved.

704, the gateway forwarding plane device searches for context information corresponding to a data packet's characteristic information, and buffers or discards the data packet if the search fails.

The data packet's characteristic information includes an APN, a UE IP address, tunnel information or the like. For example, tunnel information of a GTP packet includes a gateway IP address and a TEID. For another example, tunnel information of a PMIP packet includes a gateway IP address and a GRE key.

For example, since the gateway forwarding plane device has deleted the context information of the UE, the corresponding context information is not found, namely the search fails. The gateway forwarding plane device may buffer the data packet or discard the data packet.

Alternatively, if a UE IP address of the received data packet is not a UE IP address in the undeleted part of context information in step 702, the data packet is discarded. Alternatively, the procedure may be ended at the moment, or the gateway forwarding plane device may further judge whether the UE IP address of the received data packet is a user-subscribed static IP address according to a list of static IP addresses. For example, the list of static IP addresses may be configured by an administrator, including configuring locally or configuring remotely. If the UE IP address is not a user-subscribed static IP address, the data packet is discarded. Alternatively, the procedure may be ended at the moment. In this way, signaling interaction between the forwarding plane device and the control plane device may be effectively reduced.

According to the embodiment of the present invention, under the architecture that control and forwarding are decoupled, when the gateway forwarding plane device does not find the context information corresponding to the received data packet's characteristic information, the gateway forwarding plane device reports the received data packet's characteristic information to the gateway control plane device, so that the gateway control plane device acquires the context information. In this way, the gateway forwarding plane device can acquire context information to the greatest extent under the condition that the context information is lost, thereby ensuring accurate forwarding of the data packet to the greatest extent.

Moreover, information processing under the conditions that a UE is in an Idle state, a UE is configured with a static IP address, a local end is abnormal and the like, is normalized to the greatest extent, namely a same processing mechanism may be adopted. Therefore, it is unnecessary to maintain complex service logics, and processing complexity of a device is reduced.

Figure 9:
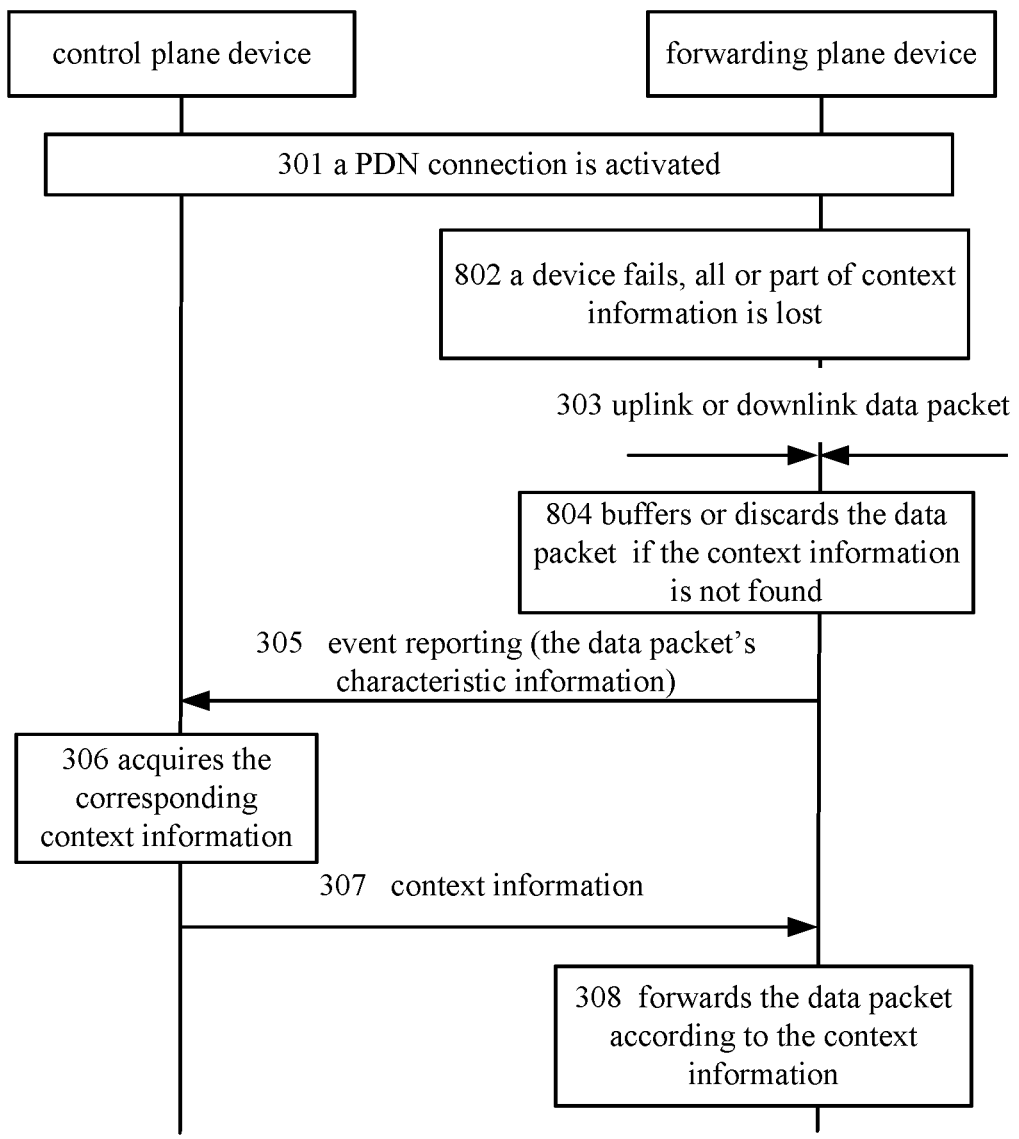
FIG. 9 is a schematic flowchart of a process of a method for processing information under architecture that control and forwarding gateway device are decoupled of another embodiment of the present invention.

FIG. 9 is a schematic flowchart of a process of a method for processing information under the architecture that control and forwarding are decoupled of another embodiment of the present invention.

In the schematic flowchart shown in FIG. 9, the steps which are the same as or similar to those in FIG. 4 are indicated by same reference signs, and thus are not redundantly described herein so as to avoid repetition. The method of FIG. 9 may be applied to conditions that a UE is in an Idle state, a UE is configured with a static IP address, a local end is abnormal and the like. It should be understood that the present invention does not set limitation to a condition to which the method is applied.

802, a gateway forwarding plane device fails, which results in that all or part of context information is lost.

804, the gateway forwarding plane device searches for context information corresponding to a data packet's characteristic information, and buffers or discards the data packet if the search fails.

The data packet's characteristic information includes an APN, a UE IP address, tunnel information or the like. For example, tunnel information of a GTP packet includes a gateway IP address and a TEID. For another example, tunnel information of a PMIP packet includes a gateway IP address and a GRE key.

For example, all of the context information is lost, and the gateway forwarding plane device cannot find corresponding context information, namely the search fails. The gateway forwarding plane device may buffer the data packet or discard the data packet. Alternatively, the gateway forwarding plane device may further judge whether a UE IP address of the received data packet is a user-subscribed static IP address according to a list of static IP addresses. For example, the list of static IP addresses may be configured by an administrator, including configuring locally or configuring remotely. If the UE IP address is not a user-subscribed static IP address, the data packet is discarded. Alternatively, the procedure may be ended at the moment. In this way, signaling interaction between the forwarding plane device and the control plane device may be effectively reduced.

For another example, part of the context information is lost, and the gateway forwarding plane device cannot find corresponding context information, namely the search fails. The gateway forwarding plane device may buffer the data packet or discard the data packet. Alternatively, if part of the context information which is not lost includes a UE IP address, and a UE IP address of the received data packet is not a UE IP address in the remaining part of context information in step 802, the data packet is discarded. Alternatively, the procedure may be ended at the moment, or the gateway forwarding plane device may further judge whether the UE IP address of the received data packet is a user-subscribed static IP address according to a list of static IP addresses. For example, the list of static IP addresses may be configured by an administrator, including configuring locally or configuring remotely. If the UE IP address is not a user-subscribed static IP address, the data packet is discarded. Alternatively, the procedure may be ended at the moment. In this way, signaling interaction between the forwarding plane device and the control plane device may be effectively reduced.

According to the embodiment of the present invention, under the architecture that control and forwarding are decoupled, when the gateway forwarding plane device does not find the context information corresponding to the received data packet's characteristic information, the gateway forwarding plane device reports the received data packet's characteristic information to the gateway control plane device, so that the gateway control plane device acquires the context information. In this way, the gateway forwarding plane device can acquire context information to the greatest extent under the condition that the context information is lost, thereby ensuring accurate forwarding of the data packet to the greatest extent.

Moreover, information processing under the conditions that a UE is in an Idle state, a UE is configured with a static IP address, a local end is abnormal and the like, is normalized to the greatest extent, namely a same processing mechanism may be adopted. Therefore, it is unnecessary to maintain complex service logics, and processing complexity of a device is reduced.

Figure 10:
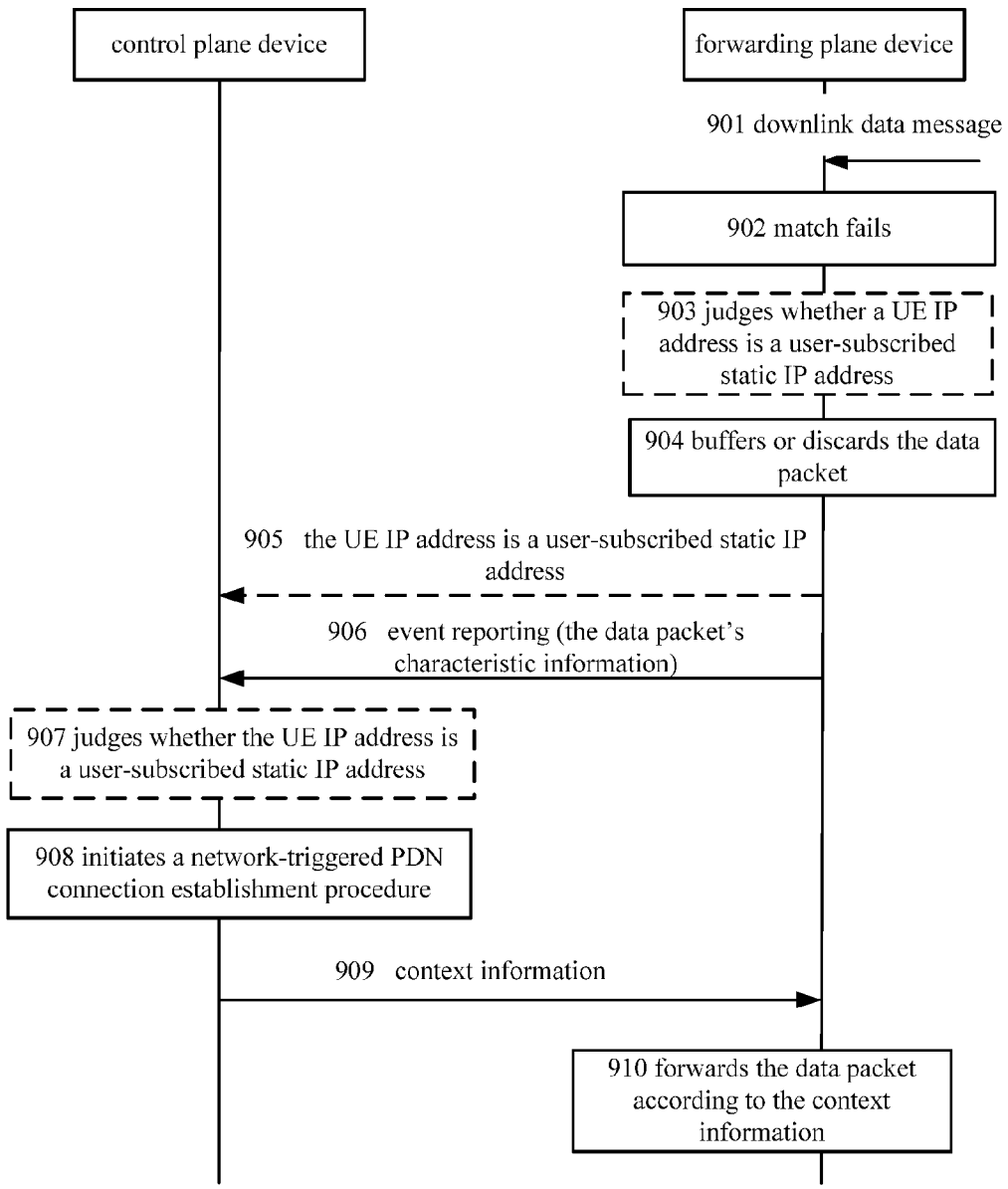
FIG. 10 is a schematic flowchart of a process of a method for processing information under architecture that control and forwarding gateway device are decoupled of another embodiment of the present invention.

FIG. 10 is a schematic flowchart of a process of a method for processing information under the architecture that control and forwarding are decoupled of another embodiment of the present invention.

The method of FIG. 10 is applied to a condition that a UE is configured with a static IP address. It should be understood that, the embodiment of the present invention does not limit the condition such as a UE is in an Idle state, a local end is abnormal and the like.

901, a gateway forwarding plane device receives a downlink data packet.

For example, the gateway forwarding plane device receives a GTP packet or a PMIP packet.

Alternatively, as one embodiment, the data packet received by the gateway forwarding plane device may be an uplink data packet and/or a downlink data packet. It should be understood that the embodiment of present invention does not set limitation to specific form of the data packet.

902, gateway forwarding plane does not find context information corresponding to the data packet's characteristic information.

The data packet's characteristic information includes an APN, a UE IP address, tunnel information or the like. For example, tunnel information of a GTP packet includes a gateway IP address and a TEID. For another example, tunnel information of a PMIP packet includes a gateway IP address and a GRE key.

For example, under the condition that a UE is configured with a static IP address and a PDN connection is not activated, the gateway forwarding plane device fails to find the context information.

Alternatively, step 903 is executed.

903, the gateway forwarding plane device judges whether a UE IP address is a user-subscribed static IP address.

Alternatively, the gateway forwarding plane device may judge whether a UE IP address of the received data packet is a user-subscribed static IP address according to a list of static IP addresses. For example, the list of static IP addresses may be configured by an administrator, including configuring locally or configuring remotely.

904, the gateway forwarding plane device buffers or discards the data packet.

For example, if the UE IP address is not a user-subscribed static IP address, the data packet is discarded, and alternatively, the procedure may be ended at the moment. In this way, signaling interaction between the forwarding plane device and the control plane device may be effectively reduced. If the UE IP address is a user-subscribed static IP address, step 905 may be further executed.

905, the gateway forwarding plane device sends information about that the UE IP address is a user-subscribed static IP address to a gateway control plane device.

906, the gateway forwarding plane device sends an event reporting message to the gateway control plane device, wherein the event reporting message carries the data packet's characteristic information.

907, the gateway control plane device judges whether the UE IP address is a user-subscribed static IP address.

908, the gateway control plane device initiates a network-triggered PDN connection establishment procedure.

Alternatively, in one implementation manner, the gateway control plane device acquires corresponding context information, and step 909 is executed. For example, if in step 905, the information about that the UE IP address is a user-subscribed static IP address, that is sent by the forwarding plane device, is received, or in step 907, the gateway control plane device judges that the UE IP address of the data packet is a user-subscribed static IP address, the gateway control plane device initiates the network-triggered PDN connection establishment procedure.

In another implementation manner, when the gateway control plane device does not acquire corresponding context information, for example, in step 906, the gateway control plane device fails to find the context information corresponding to the data packet's characteristic information received, and in step 907, further judges that a user IP address of the data packet is not a user-subscribed static IP address, the gateway control plane device sends an instruction message to the gateway forwarding plane device, wherein the instruction message is used for instructing the gateway forwarding plane device to discard the data packet and/or to notify a sending end of the data packet of occurrence of abnormity.

909, the gateway control plane device sends the acquired context information to the forwarding plane device.

910, the gateway forwarding plane device forwards the data packet according to the context information.

According to the embodiment of the present invention, under the architecture that control and forwarding are decoupled, when the gateway forwarding plane device does not find the context information corresponding to the received data packet's characteristic information, the gateway forwarding plane device reports the received data packet's characteristic information to the gateway control plane device, so that the gateway control plane device acquires the context information. In this way, the gateway forwarding plane device can acquire context information to the greatest extent under the condition that the context information is lost, thereby ensuring accurate forwarding of the data packet to the greatest extent.

Moreover, information processing under the conditions that a UE is in an Idle state, a UE is configured with a static IP address, a local end is abnormal and the like, is normalized to the greatest extent, namely a same processing mechanism may be adopted. Therefore, it is unnecessary to maintain complex service logics, and processing complexity of a device is reduced.

Figure 11:
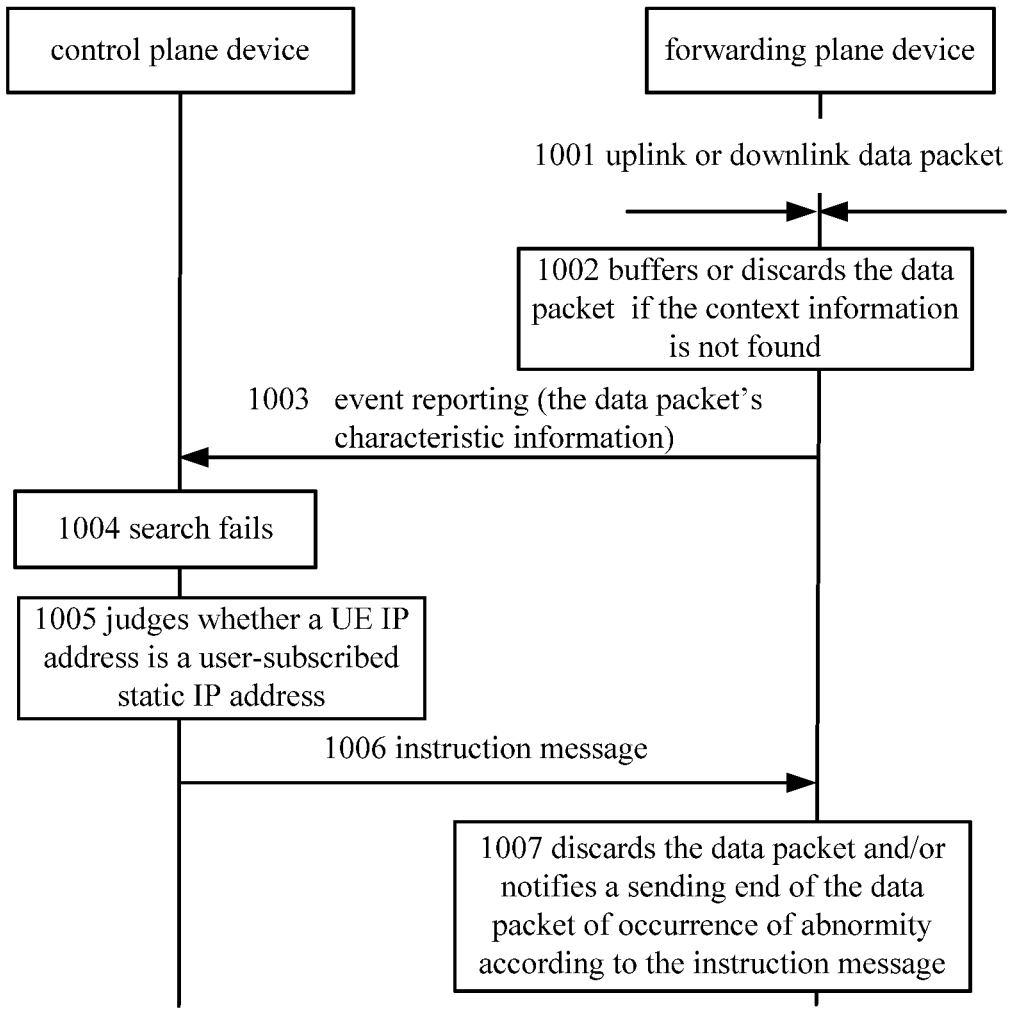
FIG. 11 is a schematic flowchart of a process of a method for processing information under architecture that control and forwarding gateway device are decoupled of another embodiment of the present invention.

FIG. 11 is a schematic flowchart of a process of a method for processing information under the architecture that control and forwarding are decoupled of another embodiment of the present invention.

The method of FIG. 11 is applied to a condition that a local end is abnormal. It should be understood that, the embodiment of the present invention does not limit the condition such as a UE is configured with a static IP address, a UE is in an Idle state and the like.

1001, a gateway forwarding plane device receives an uplink or a downlink data packet.

For example, the gateway forwarding plane device receives a downlink data packet. Specifically, the gateway forwarding plane device receives a common IP packet, a GTP (GPRS Tunneling Protocol) packet, a PMIP (Proxy Mobile IP) packet, an MIP (Mobile IP) packet, a GRE (Generic Route Encapsulation) packet, an L2TP (Layer 2 Tunnelling Protocol) packet or the like.

1002, the gateway forwarding plane device searches for context information corresponding to the data packet's characteristic information, and buffers or discards the data packet if the search fails.

The data packet's characteristic information includes an APN, a UE IP address, tunnel information or the like. For example, tunnel information of a GTP packet includes a gateway IP address and a TEID. For another example, tunnel information of a PMIP packet includes a gateway IP address and a GRE key.

For example, in the embodiment of the present invention, all or part of context information is lost due to failure of the forwarding plane device; or, the gateway forwarding plane device deletes all or part of context information, so that the search of the context information fails. It should be understood that, no matter in which manner all or part of the context information is deleted by the gateway forwarding plane device, it shall fall into the scope of the embodiment of the present invention. It also should be noted that, the embodiment of the present invention does not set limitation to a reason the gateway forwarding plane device fails to find the context information.

Alternatively, the gateway forwarding plane device may further judge whether a UE IP address of the received data packet is a user-subscribed static IP address according to a list of static IP addresses. For example, the list of static IP addresses may be configured by an administrator, including configuring locally or configuring remotely. If the UE IP address is not a user-subscribed static IP address, the data packet is discarded. Alternatively, the procedure may be ended at the moment. In this way, signaling interaction between the forwarding plane device and the control plane device may be effectively reduced.

1003, the gateway forwarding plane device sends an event reporting message to a gateway control plane device, wherein the event reporting message carries the data packet's characteristic information.

Alternatively, the gateway forwarding plane device may also send a judgment result of whether the UE IP address of the data packet is a user-subscribed static IP address to the gateway control plane device. For example, if the UE IP address of the data packet belongs to the list of static IP addresses, then the UE IP address of the data packet is a user-subscribed static IP address, and the gateway forwarding plane device sends information about that the UE IP address is a user-subscribed static IP address to the gateway control plane device.

1004, the gateway forwarding plane device fails to find the context information corresponding to the data packet's characteristic information.

Alternatively, step 1005 is executed or step 1006 is executed.

1005, the gateway control plane device judges whether the UE IP address is a user-subscribed static IP address.

Further, when in step 1005, the gateway control plane device judges that the UE IP address of the data packet is not a user-subscribed static IP address, step 1006 is alternatively executed.

1006, the gateway control plane device sends an instruction message to the gateway forwarding plane device.

1007, the gateway forwarding plane device discards the data packet and/or notifies a sending end of the data packet of occurrence of abnormality according to the instruction message.

According to the embodiment of the present invention, under the architecture that control and forwarding are decoupled, when the gateway forwarding plane device does not find the context information corresponding to the received data packet's characteristic information, the received data packet's characteristic information is reported to the gateway control plane device, so that the gateway control plane device acquires the context information. If the control plane device does not acquire the corresponding context information, the control plane device may instruct the forwarding plane device to discard the data packet and/or to notify the sending end of the data packet of occurrence of abnormality. In this way, information processing under the conditions that, a local end is abnormal, and in the meanwhile, a UE is in an Idle state, a UE is configured with a static IP address and the like, is normalized to the greatest extent, namely a same processing mechanism may be adopted. Therefore, it is unnecessary to maintain complex service logics, and processing complexity of a device is reduced.

Figure 12:
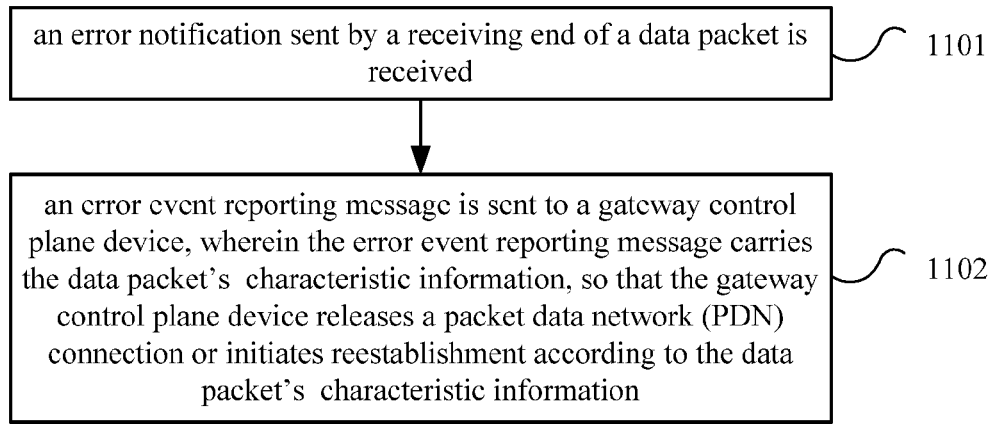
FIG. 12 is a flowchart of a method for processing information by a gateway forwarding plane device of an embodiment of the present invention.

FIG. 12 is a flowchart of a method for processing information by a gateway forwarding plane device of an embodiment of the present invention. The method of FIG. 12 is executed by a gateway forwarding plane device (e.g. GW-U 12 of FIG. 1).

1101, an error notification sent by a receiving end of a data packet is received.

1102, an error event reporting message is sent to a gateway control plane device, wherein the error event reporting message carries the data packet's characteristic information, so that the gateway control plane device releases a packet data network (PDN) connection or initiates reestablishment according to the data packet's characteristic information.

The embodiment of the present invention may be applied to conditions that a UE is in an Idle state, a UE is configured with a static IP address, a local end is abnormal and the like. It should be understood that the present invention does not set limitation to a specific condition to which the method is applied.

It should be further understood that the embodiment of the present invention does not set limitation to the number of the gateway forwarding plane devices and the number of the gateway control plane devices, e.g., one gateway forwarding plane device may correspond to at least one gateway control plane device.

The data packet's characteristic information includes an APN, a UE IP address, tunnel information or the like. For example, tunnel information of a GTP packet includes a gateway IP address and a TEID. For another example, tunnel information of a PMIP packet includes a gateway IP address and a GRE key.

Alternatively, as one embodiment, the data packet may be a GTP packet, a PMIP packet or the like.

Alternatively, as another embodiment, the error notification may be a GTP error instruction packet, an ICMIP (Internet Control Message Protocol) packet or the like.

Alternatively, as another embodiment, in step 1102, an error instruction packet may be sent to the gateway control plane device and the error instruction packet carries the data packet's characteristic information, and may notify the gateway control plane in a signaling format, but the embodiment of the present invention is not limited thereto.

Non-limited examples of a method for processing information under the architecture that control and forwarding are decoupled of the embodiment of the present invention will be described in more detail below in combination with FIG. 14.

According to the embodiment of the present invention, under the architecture that control and forwarding are decoupled, when the error notification sent by the receiving end of the data packet is received, the gateway forwarding plane device reports the data packet's characteristic information to the gateway control plane device, so that the gateway control plane device releases the PDN connection or initiates reestablishment according to the data packet's characteristic information. In this way, the gateway forwarding plane device can acquire the context information to the greatest extent under the condition that the context information is lost, thereby ensuring accurate forwarding of the data packet to the greatest extent.

Moreover, information processing under the conditions that a UE is in an Idle state, a UE is configured with a static IP address, a local end is abnormal and the like, is normalized to the greatest extent, namely a same processing mechanism may be adopted. Therefore, it is unnecessary to maintain complex service logics, and processing complexity of a device is reduced.

Figure 13:
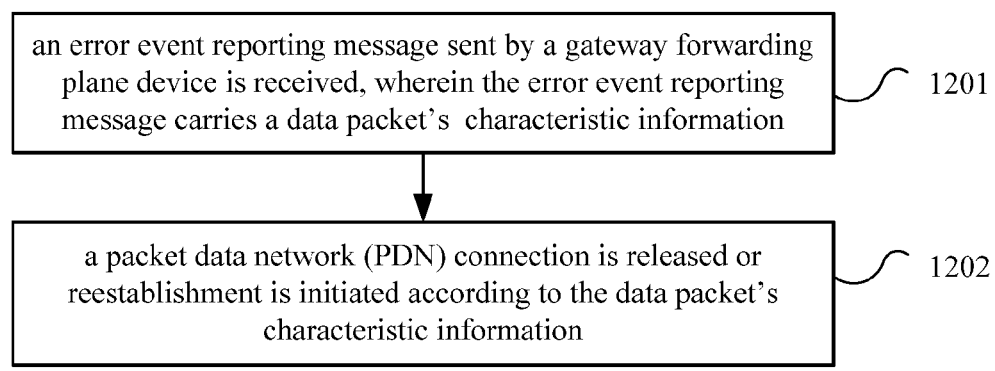
FIG. 13 is a flowchart of a method for processing information by a gateway control plane device of another embodiment of the present invention.

FIG. 13 is a flowchart of a method for processing information by a gateway forwarding plane device of another embodiment of the present invention. The method of FIG. 13 is executed by a gateway control plane device (e.g. GW-C 11 of FIG. 1), and corresponds to the method of FIG. 12. Hence, description repeating the embodiment of FIG. 12 is appropriately omitted.

1201, an error event reporting message sent by a gateway forwarding plane device is received, wherein the error event reporting message carries a data packet's characteristic information.

1202, a packet data network (PDN) connection is released or reestablishment is initiated according to the data packet's characteristic information.

The embodiment of the present invention may be applied to conditions that a UE is in an Idle state, a UE is configured with a static IP address, a local end is abnormal and the like. It should be understood that the present invention does not set limitation to a specific condition to which the method is applied.

It should be further understood that, the embodiment of the present invention does not set limitation to the number of the gateway forwarding plane devices and the number of the gateway control plane devices, e.g., one gateway forwarding plane device may correspond to at least one gateway control plane device.

The data packet's characteristic information includes an APN, a UE IP address, tunnel information or the like. For example, tunnel information of a GTP packet includes a gateway IP address and a TEID. For another example, tunnel information of a PMIP packet includes a gateway IP address and a GRE key.

Alternatively, as one embodiment, the data packet may be a GTP packet, a PMIP packet or the like.

Alternatively, as another embodiment, in step 1201, the gateway control plane device may receive an error instruction packet sent by the gateway forwarding plane device and the data packet's characteristic information. However, it should be appreciated that the embodiment of the present invention is not limited thereto.

According to the embodiment of the present invention, under the architecture that control and forwarding are decoupled, when the error notification sent by the receiving end of the data packet is received, the gateway forwarding plane device reports the data packet's characteristic information to the gateway control plane device, so that the gateway control plane device releases the PDN connection or initiates reestablishment according to the data packet's characteristic information. In this way, the gateway forwarding plane device can acquire the context information to the greatest extent under the condition that the context information is lost, thereby ensuring accurate forwarding of the data packet to the greatest extent.

Moreover, information processing under the conditions that a UE is in an Idle state, a UE is configured with a static IP address, a local end is abnormal and the like, is normalized to the greatest extent, namely a same processing mechanism may be adopted. Therefore, it is unnecessary to maintain complex service logics, and processing complexity of a device is reduced.

The embodiment of the present invention will be described in detail hereinafter in combination with a specific example. In FIG. 14, a gateway control plane device may be a unified gateway control plane UGW-C under SAE architecture of a 3GPP evolved network, and a gateway forwarding plane device may be a unified gateway forwarding plane UGW-U. It should be noted that the embodiment of the present invention is not limited thereto. The gateway forwarding plane device and the gateway control plane device may be gateway devices of which control and forwarding are decoupled of other network. It should be further understood that the embodiment of the present invention does not set limitation to the number of the gateway forwarding plane devices and the number of the gateway control plane devices, e.g., one gateway forwarding plane device may correspond to at least one gateway control plane device.

Figure 14:
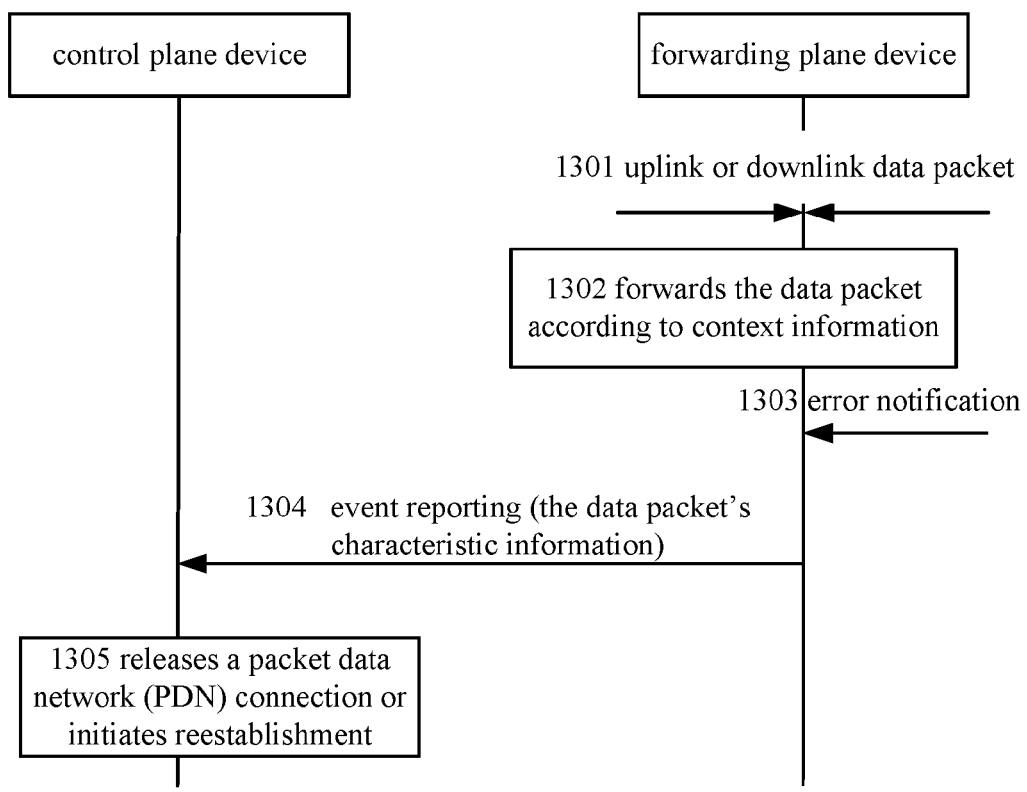
FIG. 14 is a schematic flowchart of a process of a method for processing information under architecture that control and forwarding gateway device are decoupled of another embodiment of the present invention.

FIG. 14 is a schematic flowchart of a process of a method for processing information under the architecture that control and forwarding are decoupled in the embodiment of the present invention, which is applicable to the gateway system of FIG. 1.

FIG. 14 is a schematic flowchart of processes of a method for processing information under the architecture that control and forwarding are decoupled of an embodiment of the present invention.

The method of FIG. 14 is applied to a condition that an opposite end is abnormal, and meanwhile, may be applied to a condition that a UE is in an Idle state, a UE is configured with a static IP address, a local end is abnormal and the like. It should be understood that the present invention does not set limitation to a specific condition to which the method is applied.

1301, a gateway forwarding plane device receives an uplink or a downlink data packet.

For example, the gateway forwarding plane device receives a downlink data packet, and specifically, the gateway forwarding plane device receives a GTP packet or a PMIP packet.

1302, the gateway forwarding plane device forwards the data packet according to context information.

1303, the gateway forwarding plane device receives an error notification.

For example, the error notification may be a GTP error instruction packet, an ICMIP packet or the like.

1304, the gateway forwarding plane device sends an error event reporting message to a gateway control plane device, wherein the error event reporting message carries the data packet's characteristic information.

The data packet's characteristic information includes an APN, a UE IP address, tunnel information or the like. For example, tunnel information of a GTP packet includes a gateway IP address and a TEID. For another example, tunnel information of a PMIP packet includes a gateway IP address and a GRE key.

1305, the gateway control plane releases a packet data network (PDN) connection or initiates reestablishment according to the data packet's characteristic information.

According to the embodiment of the present invention, under the architecture that control and forwarding are decoupled, when the error notification sent by the receiving end of the data packet is received, the gateway forwarding plane device reports the data packet's characteristic information to the gateway control plane device, so that the gateway control plane device releases the PDN connection or initiates reestablishment according to the data packet's characteristic information. In this way, the gateway forwarding plane device can acquire the context information to the greatest extent under the condition that the context information is lost, thereby ensuring accurate forwarding of the data packet to the greatest extent.

Moreover, information processing under the conditions that a UE is in an Idle state, a UE is configured with a static IP address, a local end is abnormal and the like, is normalized to the greatest extent, namely a same processing mechanism may be adopted. Therefore, it is unnecessary to maintain complex service logics, and processing complexity of a device is reduced.

Figure 15:
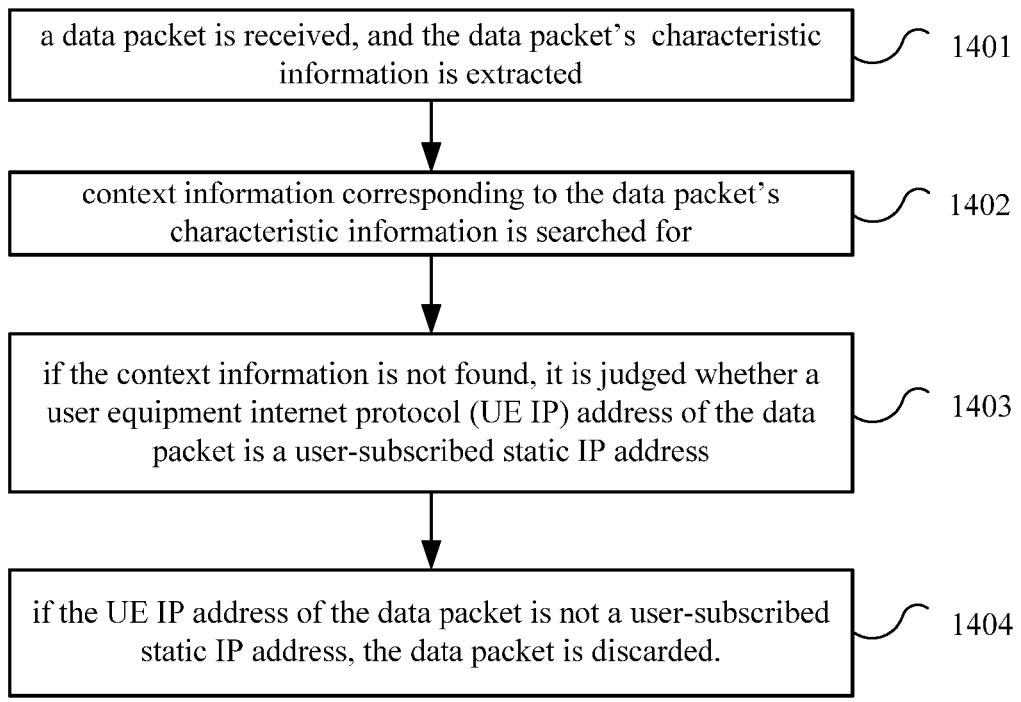
FIG. 15 is a flowchart of a method for processing information by a gateway forwarding plane device of an embodiment of the present invention.

FIG. 15 is a flowchart of a method for processing information by a gateway forwarding plane device of an embodiment of the present invention. The method of FIG. 15 is executed by a gateway forwarding plane device (e.g., GW-U 12 of FIG. 1).

1401, a data packet is received, and the data packet's characteristic information is extracted.

1402, context information corresponding to the data packet's characteristic information is searched for.

1403, if the context information is not found, it is judged whether a user equipment internet protocol (UE IP) address of the data packet is a user-subscribed static IP address.

1404, if the UE IP address of the data packet is not a user-subscribed static IP address, the data packet is discarded.

The embodiment of the present invention may be applied to conditions that a UE is in an Idle state, a UE is configured with a static IP address, a local end is abnormal and the like. It should be understood that the present invention does not set limitation to a specific condition to which the method is applied.

It should be further understood that the embodiment of the present invention does not set limitation to the number of the gateway forwarding plane devices and the number of the gateway control plane devices, e.g., one gateway forwarding plane device may correspond to at least one gateway control plane device.

The data packet's characteristic information includes an APN, a UE IP address, tunnel information or the like. For example, tunnel information of a GTP packet includes a gateway IP address and a TEID. For another example, tunnel information of a PMIP packet includes a gateway IP address and a GRE key.

Alternatively, as one embodiment, the data packet may be a GTP packet, a PMIP packet or the like.

According to the embodiment of the present invention, under the architecture that control and forwarding are decoupled, the gateway forwarding plane device searches for the context information corresponding to the received data packet's characteristic information, judges, if the search fails, whether the user equipment Internet Protocol (UE IP) address of the data packet is a user-subscribed static IP address, and discards the data packet if the UE IP address of the data packet is not a user-subscribed static IP address. In this way, signaling interaction between the gateway forwarding plane device and the gateway control plane may be effectively reduced.

Figure 16:
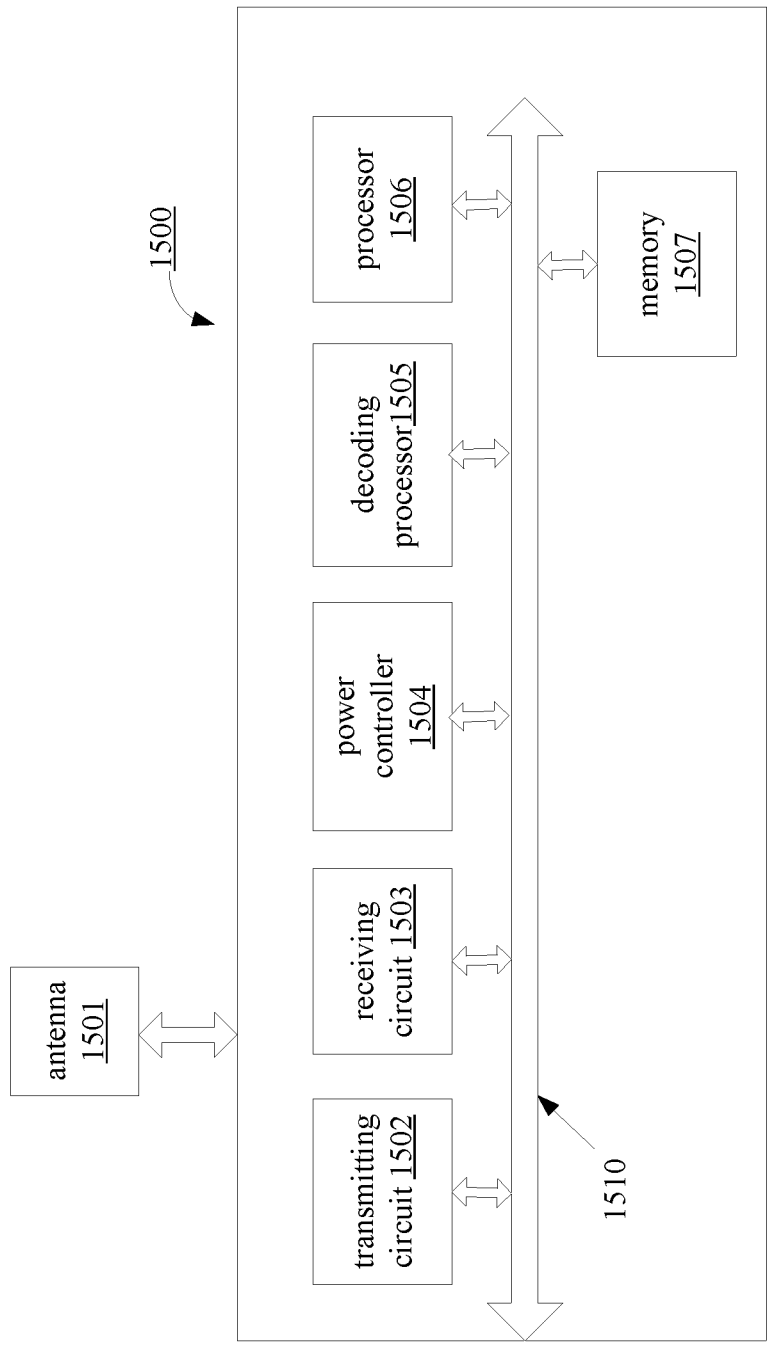
FIG. 16 is a block diagram of a device of an embodiment of the present invention.

The embodiments of the present invention further provide apparatus embodiments for implementing the respective steps and methods in the above-mentioned method embodiments. The embodiments of the present invention may be applied to a gateway forwarding plane device and a gateway control plane device in various communication systems. FIG. 16 shows an embodiment of a device, and in this embodiment, the device 1500 includes a transmitting circuit 1502, a receiving circuit 1503, a power controller 1506, a decoding processor 1505, a processor 1506, a memory 1507 and an antenna 1501. The processor 1506 controls an operation of the device 1500, and may further be referred to as a central processing unit (CPU) or a processor. The memory 1507 may include a read-only memory and a random access memory, and provides an instruction and data for the processor 1506. A part of the memory 1507 may further include a non-volatile random access memory (NVRAM). In a specific application, the device 1500 may be embedded into, or the device 1500 per se may be, a wireless communication device such as, for example, a mobile phone and the like, and may further include a carrier for accommodating the transmitting circuit 1502 and the receiving circuit 1503, so as to allow the device 1500 to transmit and receive data with a remote position. The transmitting circuit 1502 and the receiving circuit 1503 may be coupled to the antenna 1501. Respective components of the device 1500 are coupled together through a bus system 1510, wherein besides a data bus, the bus system 1510 further includes a power bus, a control bus and a state signal bus. For the purpose of clear illustration, various buses are marked as the bus system 1510 in the figure. The device 1500 may further include the processor 1506 for processing a signal, the power controller 1504 and the decoding processor 1505.

The methods disclosed by the above-mentioned embodiments of the present invention may be implemented by the above-mentioned device 1500, or are primarily implemented by the processor 1506 and the transmitting circuit 1502 therein. The processor 1506 may be an integrated circuit chip, and has a signal processing capability. In an implementation process, the respective steps of the above-mentioned methods may be completed through an integrated logic circuit of a hardware in the processor 1506 or through an instruction in a software form. For executing the methods disclosed by the embodiments of the present invention, the above-mentioned decoding processor may be a general processor, a digital signal processor (DSP), an specific integrated circuit (ASIC), a field programmable gate array (FPGA) or other programmable logic device, discrete gate, transistor logic device, and a discrete hardware component. The decoding processor may implement or execute the respective methods, steps and logic block diagrams disclosed in the embodiments of the present invention. The general processor may be a microprocessor, any conventional processor or decoder or the like. The steps of the methods disclosed by the embodiments of the present invention can be directly embodied as being executed by a hardware decoding processor or executed by a combination of a hardware and a software module in the decoding processor. The software module may be positioned in a mature storage medium in the art, such as a random access memory, a flash memory, a read-only memory, a programmable read-only memory or an electrically erasable programmable memory, a register and the like. The storage medium is positioned in the memory 1507. A decoding unit reads information in the memory 1507, and the steps of the above-mentioned methods are completed in combination with the hardware thereof.

Figure 17:
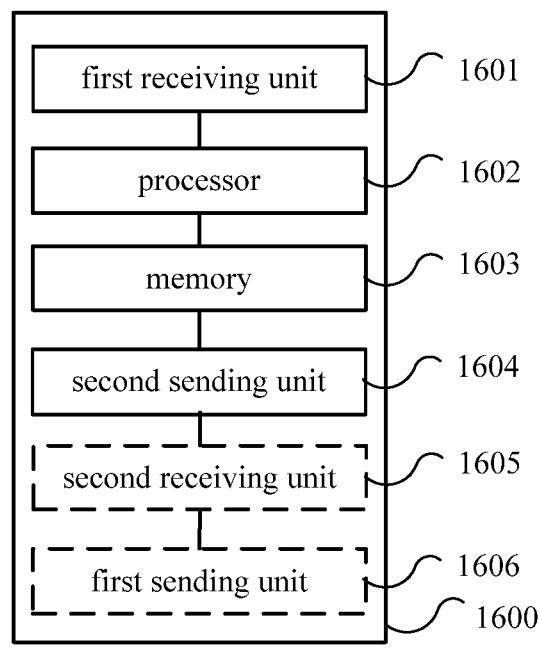
FIG. 17 is a structural block diagram of a gateway forwarding plane device of an embodiment of the present invention.

Further, FIG. 17 is a structural block diagram of a gateway forwarding plane device of an embodiment of the present invention. The GW-U 12 of FIG. 1 is one example of the gateway forwarding plane device. The gateway forwarding plane device 1600 of FIG. 17 includes a first receiving unit 1601, a processor 1602, a memory 1603 and a second sending unit 1604.

The first receiving unit 1601 is configured to receive a data packet.

The processor 1602 is configured to extract the data packet's characteristic information received by the first receiving unit 1601, and search for context information corresponding to the data packet's characteristic information. If the processor 1602 fails to find the context information, the memory 1603 is configured to buffer the data packet received by the first receiving unit 1601, or the processor 1602 is further configured to discard the data packet received by the first receiving unit 1601.

The second sending unit 1604 is configured to send an event reporting message to a gateway control plane device, wherein the event reporting message carries the data packet's characteristic information received by the first receiving unit 1601, so that the gateway control plane device acquires the context information corresponding to the data packet's characteristic information.

According to the embodiment of the present invention, under the architecture that control and forwarding are decoupled, when the gateway forwarding plane device does not find the context information corresponding to the received data packet's characteristic information, the gateway forwarding plane device reports the received data packet's characteristic information to the gateway control plane device, so that the gateway control plane device acquires the context information. In this way, the gateway forwarding plane device can acquire context information to the greatest extent under the condition that the context information is lost, thereby ensuring accurate forwarding of the data packet to the greatest extent.

The gateway forwarding plane device 1600 may realize the operations involving a gateway forwarding plane device in the embodiments of FIG. 2 to FIG. 11, and thus will not be described in detail herein so as to avoid repetition.

Alternatively, as one embodiment, the gateway forwarding plane device 1600 may further include: a second receiving unit 1605, configured to receive the context information sent by the gateway control plane device; and a first sending unit 1606, configured to forward the data packet according to the context information received by the second receiving unit 1605.

Alternatively, as another embodiment, the second receiving unit 1605 is further configured to receive an instruction message sent by the gateway control plane device; and the processor 1602 is further configured to discard the data packet according to the instruction message, and/or the first sending unit 1606 is further configured to notify a sending end of the data packet of occurrence of abnormity.

Alternatively, as another embodiment, the processor is further configured to judge whether a user equipment internet protocol (UE IP) address of the data packet is a user-subscribed static IP address. Further, the processor 1602 is specifically configured to discard the data packet if the UE IP address of the data packet is not a user-subscribed static IP address. In this way, signaling interaction between the forwarding plane device and the control plane device can be effectively reduced. Or, the second sending unit 1604 is further configured to notify, if the UE IP address of the data packet is a user-subscribed static IP address, the gateway control plane device that the UE IP address of the data packet is a user-subscribed static IP address, so that the gateway control plane device initiates a network-triggered packet data network (PDN) connection establishment procedure.

Alternatively, as another embodiment, the processor 1602 is further configured to delete part or all of context information stored by a memory of the gateway forwarding plane device. In this way, resources of the gateway forwarding plane device are saved, and cost is reduced. Further, the processor 1602 is specifically configured to delete part or all of context information stored by the gateway forwarding plane device according to a second message that is received by the second receiving unit 1605 and sent by the gateway control plane device; or, the processor 1602 is specifically configured to delete, when the gateway forwarding plane device does not transmit any data packet of a UE within a predefined time period, part or all of context information of the UE stored by the gateway forwarding plane device.

Alternatively, as another embodiment, the processor 1602 is specifically configured to delete part of the context information stored by the gateway forwarding plane device, wherein remaining context information at least including a UE IP address.

Information processing under the conditions that a UE is in an Idle state, a UE is configured with a static IP address, a local end is abnormal and the like, is normalized to the greatest extent, namely a same processing mechanism may be adopted. Therefore, it is unnecessary to maintain complex service logics, and processing complexity of a device is reduced.

Figure 18:
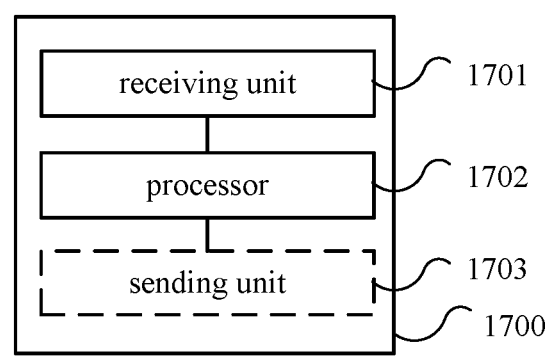
FIG. 18 is a structural block diagram of a gateway control plane device of another embodiment of the present invention.

FIG. 18 is a structural block diagram of a gateway control plane device of another embodiment of the present invention. The GW-C 11 of FIG. 1 is one example of the gateway control plane device. The gateway control plane device 1700 of FIG. 18 includes a receiving unit 1701 and a processor 1702.

The gateway control plane device 1700 may implement the respective steps involving a gateway control plane device in the methods of FIG. 2 to FIG. 11, and thus will not described in detail herein for avoiding repetition.

The receiving unit 1701 is configured to receive an event reporting message sent by a gateway forwarding plane device, wherein the event reporting message carries a data packet's characteristic information received by the gateway forwarding plane device.

The processor 1702 is configured to acquire context information corresponding to the data packet's characteristic information received by the receiving unit 1701.

According to the embodiment of the present invention, under the architecture that control and forwarding are decoupled, when the gateway forwarding plane device does not find the context information corresponding to the received data packet's characteristic information, the gateway forwarding plane device reports the received data packet's characteristic information to the gateway control plane device, so that the gateway control plane device acquires the context information. In this way, the gateway forwarding plane device can acquire context information to the greatest extent under the condition that the context information is lost, thereby ensuring accurate forwarding of the data packet to the greatest extent.

Moreover, information processing under the conditions that a UE is in an Idle state, a UE is configured with a static IP address, a local end is abnormal and the like, is normalized to the greatest extent, namely a same processing mechanism may be adopted. Therefore, it is unnecessary to maintain complex service logics, and processing complexity of a device is reduced.

The gateway control plane device 1700 may implement the respective steps involving the gateway control plane device in the methods of FIG. 2 to FIG. 11, and thus will not described in detail herein for avoiding repetition.

Alternatively, as one embodiment, the processor 1702 is specifically configured to trigger, when a user equipment (UE) corresponding to the data packet is in an Idle state, the UE to exit the Idle state; or specifically configured to judge, >when the context information corresponding to the data packet's characteristic information is not found, whether a user equipment internet protocol (UE IP) address of the data packet is a user-subscribed static IP address, and if the UE IP address of the data packet is a user-subscribed static IP address, the gateway control plane device initiates a network-triggered packet data network (PDN) connection establishment procedure; or specifically configured to initiate, when the receiving unit 1701 receives information about that a UE IP address of the data packet is a user-subscribed static IP address, that is sent by the gateway forwarding plane device, a network-triggered PDN connection establishment procedure.

The gateway control plane device 1700 may further include a sending unit 1703.

Alternatively, as another embodiment, the sending unit 1703 is further configured to send, if the processor 1702 acquires the context information, the context information to the gateway forwarding plane device, so that the gateway forwarding plane device forwards the data packet according to the context information; and configured to send, if the processor 1702 does not acquire the context information, a first message to the gateway forwarding plane device, wherein the first message is used for instructing the gateway forwarding plane device to discard the data packet and/or to notify a sending end of the data packet of occurrence of abnormity.

Alternatively, as another embodiment, the sending unit 1703 is further configured to send a second message to the gateway forwarding plane device, wherein the second message is used for instructing the gateway forwarding plane device to delete part or all of context information stored by the gateway forwarding plane device. Further, the sending unit 1703 is specifically configured to send the second message to the gateway forwarding plane device when a UE does not exit an Idle state within a predefined time period, wherein the second message is used for instructing the gateway forwarding plane device to delete part or all of context information of the UE stored by the gateway forwarding plane device. In this way, resources of the gateway forwarding plane device are saved, and cost is reduced.

Figure 19:
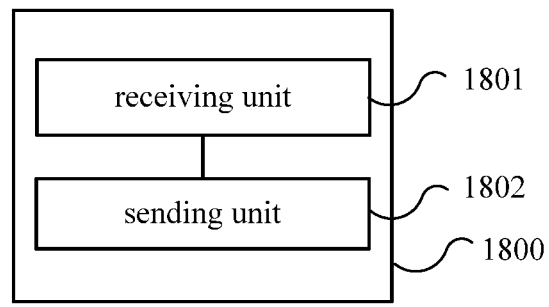
FIG. 19 is a structural block diagram of a gateway forwarding plane device of an embodiment of the present invention.

FIG. 19 is a structural block diagram of a gateway forwarding plane device of an embodiment of the present invention. The GW-U 12 of FIG. 1 is one example of the gateway forwarding plane device. The gateway forwarding plane device 1800 of FIG. 19 includes a receiving unit 1801 and a sending unit 1802.

The receiving unit 1801 is configured to receive an error notification sent by a receiving end of a data packet.

The sending unit 1802 is configured to send an error event reporting message to a gateway control plane device, wherein the error event reporting message carries the data packet's characteristic information received by the receiving unit 1801, so that the gateway control plane device releases a packet data network (PDN) connection or initiates reestablishment according to the data packet's characteristic information.

The data packet's characteristic information includes an APN, a UE IP address, tunnel information or the like. For example, tunnel information of a GTP packet includes a gateway IP address and a TEID. For another example, tunnel information of a PMIP packet includes a gateway IP address and a GRE key.

According to the embodiment of the present invention, under the architecture that control and forwarding are decoupled, when the gateway forwarding plane device does not find the context information corresponding to the received data packet's characteristic information, the gateway forwarding plane device reports the received data packet's characteristic information to the gateway control plane device, so that the gateway control plane device acquires the context information. In this way, the gateway forwarding plane device can acquire context information to the greatest extent under the condition that the context information is lost, thereby ensuring accurate forwarding of the data packet to the greatest extent.

Moreover, information processing under the conditions that a UE is in an Idle state, a UE is configured with a static IP address, a local end is abnormal and the like, is normalized to the greatest extent, namely a same processing mechanism may be adopted. Therefore, it is unnecessary to maintain complex service logics, and processing complexity of a device is reduced.

The gateway forwarding plane device 1800 may realize the operations involving a gateway forwarding plane device of FIG. 14, and thus will not be described herein in detail so as to avoid repetition.

Alternatively, as one embodiment, the sending unit 1802 is specifically configured to send an error notification packet to the gateway control plane device, wherein the error notification packet may be a common IP packet, a GTP (GPRS Tunneling Protocol) packet, a PMIP (Proxy Mobile IP) packet, an MIP (Mobile IP) packet, a GRE (Generic Route Encapsulation) packet, an L2TP (Layer 2 Tunnelling Protocol) packet or the like.

Figure 20:
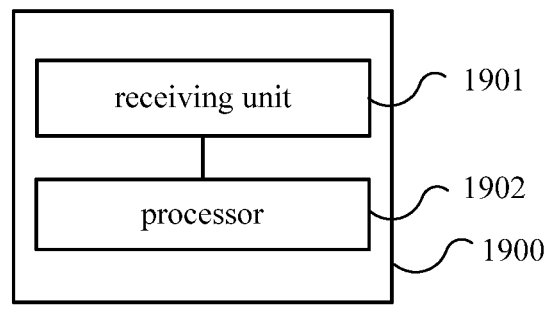
FIG. 20 is a structural block diagram of a gateway control plane device of another embodiment of the present invention.

FIG. 20 is a structural block diagram of a gateway control plane device of another embodiment of the present invention. The GW-C 11 of FIG. 1 is one example of the gateway control plane device. The gateway forwarding plane device 1900 of FIG. 20 includes a receiving unit 1901 and a processor 1902.

The receiving unit 1901 is configured to receive an error event reporting message sent by a gateway forwarding plane device, wherein the error event reporting message carries a data packet's characteristic information.

The processor 1902 is configured to release a packet data network (PDN) connection or initiate reestablishment according to the data packet's characteristic information received by the receiving unit 1901.

The gateway control plane device 1900 may realize the respective steps involving a gateway control plane device of FIG. 14, and thus will not be described in detail herein for avoiding repetition.

According to the embodiment of the present invention, under the architecture that control and forwarding are decoupled, when the gateway forwarding plane device does not find the context information corresponding to the received data packet's characteristic information, the gateway forwarding plane device reports the received data packet's characteristic information to the gateway control plane device, so that the gateway control plane device acquires the context information. In this way, the gateway forwarding plane device can acquire context information to the greatest extent under the condition that the context information is lost, thereby ensuring accurate forwarding of the data packet to the greatest extent.

Moreover, information processing under the conditions that a UE is in an Idle state, a UE is configured with a static IP address, a local end is abnormal and the like, is normalized to the greatest extent, namely a same processing mechanism may be adopted. Therefore, it is unnecessary to maintain complex service logics, and processing complexity of a device is reduced.

Alternatively, as one embodiment, the receiving unit 1901 is specifically configured to receive an error notification packet sent by the gateway forwarding plane device.

Figure 21:
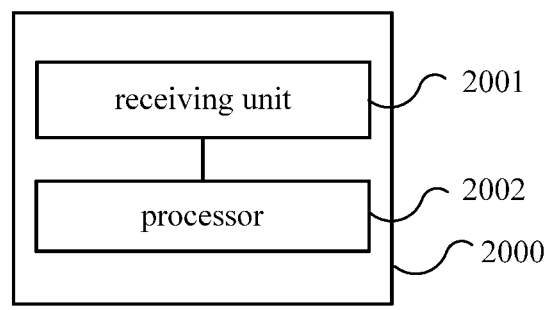
FIG. 21 is a structural block diagram of a gateway forwarding plane device of an embodiment of the present invention.

FIG. 21 is a structural block diagram of a gateway forwarding plane device of an embodiment of the present invention. The GW-U 12 of FIG. 1 is one example of the gateway forwarding plane device. The gateway forwarding plane device 2000 of FIG. 21 includes a receiving unit 2001 and a processor 2002.

The receiving unit 2001 is configured to receive a data packet.

The processor 2002 is configured to extract the data packet's characteristic information received by the receiving unit 2001, search for context information corresponding to the data packet's characteristic information, judge, if the context information is not found, whether a user equipment internet protocol (UE IP) address of the data packet is a user-subscribed static IP address, and discard the data packet if the UE IP address of the data packet is not a user-subscribed static IP address.

According to the embodiment of the present invention, under the architecture that control and forwarding are decoupled, the gateway forwarding plane device searches for context information corresponding to the received data packet's characteristic information, judges, if the search fails, whether the user equipment Internet Protocol (UE IP) address of the data packet is a user-subscribed static IP address, and discards the data packet if the UE IP address of the data packet is not a user-subscribed static IP address. In this way, signaling interaction between the gateway forwarding plane device and the gateway control plane may be effectively reduced.

It can be clearly understood by those skilled in the art that, for the purpose of convenience and briefness in description, reference may be made to corresponding processes in the aforementioned method embodiments for specific working processes of the above-described systems, devices and units, and will not be described redundantly herein.

In several embodiments provided by the present application, it should be appreciated that the disclosed systems, apparatuses and methods may be implemented in other manners. For example, the above-described apparatus embodiments are merely exemplary, e.g., division of the units is just a logic function division, and other division manners may be adopted in practical implementation, e.g., a plurality of units or components may be combined or integrated in another system, or some features may be omitted or not executed. From another point of view, the displayed or discussed mutual coupling, direct coupling or communication connection may be indirect coupling or communication connection of apparatuses or units through some interfaces, and may be in electrical, mechanical or other form.

The units illustrated as separate components may be or may not be physically separated, and a component displayed as a unit may be or may not be a physical unit, that is to say, the component may be positioned at one place or may be distributed on a plurality of network units. The objectives of the solutions of the embodiments may be fulfilled by selecting part or all of the units according to actual needs.

In addition, in various embodiments of the present invention, the respective functional units may be integrated in one processing unit, or the respective function units may separately and physically exist, or two or more units may be integrated in one unit.

What is claimed is:

1. A method, comprising:
   receiving, by a gateway forwarding plane device, a data packet, and extracting the data packet's characteristic information;
   buffering the data packet in the gateway forwarding plane device when there is no context information corresponding to the data packet's characteristic information already stored in the gateway forwarding plane device, until receiving the context information returned from a gateway control plane device, wherein the gateway control plane device and the gateway forwarding plane device are both separate and different devices;
   before receiving the context information returned from the gateway control plane device, sending, by the gateway forwarding plane device, the data packet's characteristic information to the gateway control plane device, wherein the data packet's characteristic information is used for the gateway control plane device to acquire the context information corresponding to the characteristic information of the data packet;
   acquiring, by the gateway control plane device, the context information according to the data packet's characteristic information, and sending, by the gateway control plane device, the context information to the gateway forwarding plane device; and
   forwarding by the gateway forwarding plane device, the data packet according to the received context information.

2. The method of claim 1, further comprising:
   receiving, by the gateway forwarding plane device, an instruction message from the gateway control plane device; and
   discarding, by the gateway forwarding plane device, the data packet previously buffered by the gateway forwarding plane device.

3. The method of claim 1, wherein before receiving, by the gateway forwarding plane device, the data packet, the method further comprises:
   deleting, by the gateway forwarding plane device, part or all of context information stored by the gateway forwarding plane device.

4. The method of claim 3, wherein deleting, by the gateway forwarding plane device, the part or all of the context information stored by the gateway forwarding plane device comprises:
   receiving, by the gateway forwarding plane device, a second message from the gateway control plane device, and deleting, by the gateway forwarding plane device, the context information stored by the gateway forwarding plane device according to the second message.

5. The method of claim 3, wherein deleting, by the gateway forwarding plane device, the part or all of the context information stored by the gateway forwarding plane device comprises:
deleting, by the gateway forwarding plane device, when the gateway forwarding plane device does not transmit any data packet of a UE within a predefined time period, the context information of the UE stored by the gateway forwarding plane device.

6. The method of claim 3, wherein deleting, by the gateway forwarding plane device, the part or all of the context information stored by the gateway forwarding plane device comprises:
deleting, by the gateway forwarding plane device, the part of the context information stored by the gateway forwarding plane device, wherein remaining context information after the deleting comprises a UE IP address.

7. A non-transitory readable storage medium, comprising a program or instructions, wherein when the program or instructions are being executed by one or more processors used for a gateway forwarding plane device, the program or instructions cause the one or more processors to:
receive a data packet;
extract the data packet's characteristic information, wherein the storage medium is used to buffer the data packet when there is no context information corresponding to the data packet's characteristic information already stored in the gateway forwarding plane device, until receiving the context information returned from a gateway control plane device, wherein the gateway control plane device and the gateway forwarding plane device are both separate and different devices;
before receiving the context information returned from the gateway control plane device, send the data packet's characteristic information to the gateway control plane device, wherein the data packet's characteristic information is used for the gateway control plane device to acquire the context information corresponding to the characteristic information of the data packet; and
forward the data packet according to the received context information.

8. The non-transitory readable storage medium of claim 7, wherein the data packet is a general packet radio service (GPRS) tunnel protocol (GTP) packet and the characteristic information of the data packet includes tunnel information, and the tunnel information includes a GTP tunnel end identifier (TEID).

9. The non-transitory readable storage medium of claim 7, wherein when the program or instructions are being executed, the program or instructions further cause the one or more processors to delete at least part of context information stored by the storage medium before receiving the data packet.

10. A non-transitory readable storage medium, comprising a program or instructions, wherein when the program or instructions are being executed by one or more processors used for a gateway control plane device, the program or instructions cause the one or more processors to:
receive a data packet's characteristic information from a gateway forwarding plane device, wherein the gateway control plane device and the gateway forwarding plane device are both separate and different devices;
wherein prior to receiving the data packet's characteristic information from the gateway forwarding device, and when no context information corresponding to the data packet's characteristic information is already stored in the gateway forwarding plane device, the data packet is being first buffered in the gateway forwarding plane device while waiting to receive the context information corresponding to the data packet's characteristic information, which is to be acquired by the gateway control plane device in order to send the context information to the gateway forwarding plane device, wherein the context information is to be used for the gateway forwarding plane device to afterwards forward the data packet according to the context information received from the gateway control plane device.

11. The non-transitory readable storage medium of claim 10, wherein when the program or instructions are being executed, the program or instructions further cause the one or more processors to:
trigger, when a user equipment (UE) corresponding to the data packet is in an Idle state, the UE to exit the Idle state.

12. A system, comprising:
a gateway control plane device; and
a gateway forwarding plane device, wherein the gateway forwarding plane device is configured to:
receive a data packet;
extract the data packet's characteristic information;
buffer the data packet in a memory when there is no context information corresponding to the data packet's characteristic information already stored in the gateway forwarding plane device, until receiving the context information returned from a gateway control plane device, wherein the gateway control plane device and the gateway forwarding plane device are both separate and different devices;
before receiving the context information returned from the gateway control plane device, send the data packet's characteristic information to the gateway control plane device, wherein the data packet's characteristic information is used for the gateway control plane device to acquire the context information corresponding to the characteristic information of the data packet; and
forward the data packet according to the received context information.

13. The system of claim 12, wherein the data packet is a general packet radio service (GPRS) tunnel protocol (GTP) packet and the characteristic information of the data packet includes tunnel information, and the tunnel information includes a GTP tunnel end identifier (TEID).

14. The system of claim 12, wherein the gateway control plane device is further configured to:
receive the data packet's characteristic information from the gateway forwarding plane device;
acquire the context information according to the data packet's characteristic information; and
send the context information to the gateway forwarding plane device.

15. The system of claim 12, wherein the gateway control plane device is further configured to:
send a first message to the gateway forwarding plane device when the gateway control plane device does not acquire the context information according to the data packet's characteristic information, wherein the first message instructs the gateway forwarding plane device to discard the data packet; and wherein the gateway forwarding plane device is further configured to discard the buffered data packet according to the first message.

16. The system of claim 12, wherein the gateway control plane device is further configured to:
    before receiving the characteristic information of the data packet from the gateway forwarding plane device, send a second message to the gateway forwarding plane device after a user equipment (UE) enters into an Idle state, wherein the second message instructs the gateway forwarding plane device to delete at least part of context information stored by the gateway forwarding plane device.

17. The system of claim 12, wherein the gateway control plane device is further configured to delete at least part of context information stored by the memory of the gateway forwarding plane device before receiving the data packet.

18. The system of claim 17, wherein the gateway control plane device is configured to delete the at least part of context information stored by the gateway forwarding plane device according to a second message that is from the gateway control plane device.

19. The system of claim 17, wherein the gateway control plane device is configured to delete, when the gateway forwarding plane device does not transmit any data packet of a user equipment (UE) within a predefined time period, at least part of context information of the UE stored by the gateway forwarding plane device.

20. The system of claim 19, wherein part of context information of the UE is deleted, and remaining context information at least comprises a UE Internet Protocol (IP) address.

21. The system of claim 12, wherein the system further comprises a radio access network (RAN) and a mobility management entity.

* * * * *